US012762200B2

(12) United States Patent
Blumel et al.

(10) Patent No.: US 12,762,200 B2
(45) Date of Patent: Oct. 13, 2026

(54) STABILIZED ENTANGLING OPERATIONS IN A QUANTUM COMPUTING SYSTEM

(71) Applicant: IONQ, INC., College Park, MD (US)

(72) Inventors: Reinhold Blumel, Middletown, CT (US); Yunseong Nam, North Bethesda, MD (US); Andrii Maksymov, Hyattsville, MD (US)

(73) Assignee: IONQ, INC., College Park, MD (US)

( * ) Notice: Subject to any disclaimer, the term of this patent is extended or adjusted under 35 U.S.C. 154(b) by 890 days.

(21) Appl. No.: 18/118,252

(22) Filed: Mar. 7, 2023

(65) Prior Publication Data

US 2023/0334116 A1 Oct. 19, 2023

Related U.S. Application Data

(60) Provisional application No. 63/317,936, filed on Mar. 8, 2022.

(51) Int. Cl.
*G06F 17/14* (2006.01)
*G06N 10/40* (2022.01)

(52) U.S. Cl.
CPC ............ *G06F 17/14* (2013.01); *G06N 10/40* (2022.01)

(58) Field of Classification Search
CPC ......... G06F 17/14; G06N 10/40; G06N 10/20
See application file for complete search history.

(56) References Cited

U.S. PATENT DOCUMENTS 7,346,246 B2 * 3/2008 Munro .................. G06N 10/40 706/14
7,660,533 B1 * 2/2010 Meyers .................. H04B 10/70 398/205
2003/0005010 A1 * 1/2003 Cleve ..................... G06N 10/70 708/403
2003/0164490 A1 * 9/2003 Blais ...................... G06N 10/20 257/14
2014/0280427 A1 * 9/2014 Bocharov ............. B82Y 10/00 708/200
2022/0107989 A1 * 4/2022 Kachman .............. G06N 10/00
2023/0142623 A1 * 5/2023 Leroux .................. G06N 10/20 712/25
2025/0077923 A1 * 3/2025 Spanias .................. G06N 10/40

FOREIGN PATENT DOCUMENTS

DE 102024103202 A1 * 8/2024 ............ G06N 10/80
WO WO-2024258987 A2 * 12/2024 ............ G06N 10/40

* cited by examiner

*Primary Examiner* — David A Vanore
(74) *Attorney, Agent, or Firm* — Patterson + Sheridan, LLP

(57) ABSTRACT

A method of performing a quantum computation process includes computing first Fourier coefficients of a first pulse function of a first control pulse and second Fourier coefficients of a second pulse function of a second control pulse based on a condition for closure of phase space trajectories and a condition for stabilization of phase-space closure, and computing a first linear combination of the computed first Fourier coefficients and a second linear combination of the computed second Fourier coefficients based on a condition for non-zero degree of entanglement, a condition for stabilization of the degree of entanglement, and a condition for minimized power, applying the first control pulse having the computed first pulse function to a first trapped ion of a pair of trapped ions, and the second control pulse having the computed second pulse function to a second trapped ion of a pair of trapped ions.

20 Claims, 12 Drawing Sheets

STABILIZED ENTANGLING OPERATIONS IN A QUANTUM COMPUTING SYSTEM

CROSS-REFERENCE TO RELATED APPLICATIONS

This application claims priority to U.S. Provisional Patent Application Ser. No. 63/317,936, filed on Mar. 8, 2022, which is incorporated by reference herein.

BACKGROUND

Field

The present disclosure generally relates to a method of performing computations in a quantum computing system, and more specifically, to a method of stabilizing quantum gate operations to execute a series of quantum gate operations in a quantum computing system that includes a group of trapped ions.

Description of the Related Art

Among physical systems upon which it is proposed to build large-scale quantum computers, is a group of ions (i.e., charged atoms), which are trapped and suspended in vacuum by electromagnetic fields. The ions have internal hyperfine states which are separated by frequencies in the several GHz range and can be used as the computational states of a qubit (referred to as "qubit states"). These hyperfine states can be controlled using radiation provided from a laser, or sometimes referred to herein as the interaction with laser beams. The ions can be cooled to near their motional ground states using such laser interactions. The ions can also be optically pumped to one of the two hyperfine states with high accuracy (preparation of qubits), manipulated between the two hyperfine states (single-qubit gate operations) by laser beams, and their internal hyperfine states detected by fluorescence upon application of a resonant laser beam (read-out of qubits). A pair of ions can be controllably entangled (two-qubit gate operations) by qubit-state dependent force using laser pulses that couple the ions to the collective motional modes of a group of trapped ions, which arise from the Coulombic interaction between the ions. In general, entanglement occurs when pairs or groups of ions (or particles) are generated, interact, or share spatial proximity in ways such that the quantum state of each ion cannot be described independently of the quantum state of the others, even when the ions are separated by a large distance.

Quantum computation can be performed by executing a set of single-qubit gate operations and two-qubit gate operations in such a quantum computing system. Although the methods for applying these basic building blocks of quantum computation have been established, there are errors that result from experimental parameter drift or fluctuations, such as the vibrational mode frequencies of an ion chain, in the hardware of the quantum computing system. These errors are mainly due to the lack of knowledge about the changes in the computing environment and the properties of quantum computing hardware within the quantum computing system. Thus, the experimental parameters in the quantum computing system need to be characterized frequently to perform reliable and scalable quantum computation. However, characterization typically requires repeated measurements of qubits to collect statistics over a sizable parameter space of the parameters of the quantum computing system. Thus, characterization can be an expensive and time-consuming task.

Therefore, there is a need for a method of stabilizing quantum gate operations with respect to the parameter drifts or fluctuations within an acceptable error in quantum computation.

SUMMARY

Embodiments of the present disclosure provide a method of performing a quantum computation process. The method includes computing, by a classical computer, control pulses that illuminate a plurality of trapped ions, each of the plurality of trapped ions having two frequency-separated states defining a qubit, implementing, by a system controller, the control pulses to pairs of qubits, such that the infidelity of the two-qubit gate operations induced is lowered without frequent system-parameter characterization, executing the plurality of quantum gates on the quantum processor, by applying control pulses that each cause a single-qubit gate operation and a two-qubit gate operation in each of the plurality of quantum circuits on the plurality of qubits, measuring, by the system controller, population of qubit states of the qubits in the quantum processor after executing the plurality of quantum circuits on the quantum processor, and outputting, by the classical computer, the measured population of qubit states of the qubits as a result of the execution of the plurality of quantum circuits, wherein the result of the execution of the plurality of quantum circuits are configured to be displayed on a user interface, stored in a memory of the classical computer, or transferred to another computational device.

Embodiments of the present disclosure also provide a quantum computing system. The quantum computing system includes a quantum processor comprising a plurality of physical qubits, wherein each of the physical qubits comprises a trapped ion, a classical computer configured to compute control pulses so that two-qubit gate infidelities are minimized without frequent system-parameter characterization and the total infidelity of the plurality of quantum circuits is minimized without frequent system-parameter characterization, wherein each of the plurality of quantum circuits comprises a plurality of single-qubit gates and a plurality of two-qubit gates within the plurality of the qubits, and a system controller configured to implementing the control pulses to induce two-qubit gate operations between pairs of qubits, such that the infidelity of the two-qubit gates within the plurality of qubits is lowered without frequent system-parameter characterization, executing the plurality of quantum circuits on the quantum processor, by applying control pulses that each cause a single-qubit gate operation and a two-qubit gate operation in each of the plurality of quantum circuits on the plurality of qubits, and measuring population of qubit states of the qubits in the quantum processor after executing the plurality of quantum circuits on the quantum processor, wherein the classical computer is further configured to outputting the measured population of qubit states of the qubits as a result of the execution of the plurality of quantum circuits, wherein the result of the execution of the plurality of quantum circuits are configured to be displayed on a user interface, stored in a memory of the classical computer, or transferred to another computational device.

Embodiments of the present disclosure further provide a quantum computing system comprising non-volatile memory having a number of instructions stored therein. The number of instructions, when executed by one or more processors, causes the quantum computing system to perform operations comprising computing, by a classical computer, control pulses that illuminate a plurality of trapped ions, each of the plurality of trapped ions having two frequency-separated states defining a qubit, implementing, by a system controller, the control pulses to pairs of qubits, such that the infidelity of the two-qubit gate operations induced is lowered without frequent system-parameter characterization, executing the plurality of quantum gates on the quantum processor, by applying control pulses that each cause a single-qubit gate operation and a two-qubit gate operation in each of the plurality of quantum circuits on the plurality of qubits, measuring, by the system controller, the population of qubit states of the qubits in the quantum processor after executing the plurality of quantum circuits on the quantum processor, and outputting, by the classical computer, the measured population of qubit states of the qubits as a result of the execution of the plurality of quantum circuits, wherein the result of the execution of the plurality of quantum circuits are configured to be displayed on a user interface, stored in a memory of the classical computer, or transferred to another computational device.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

Figure 1:
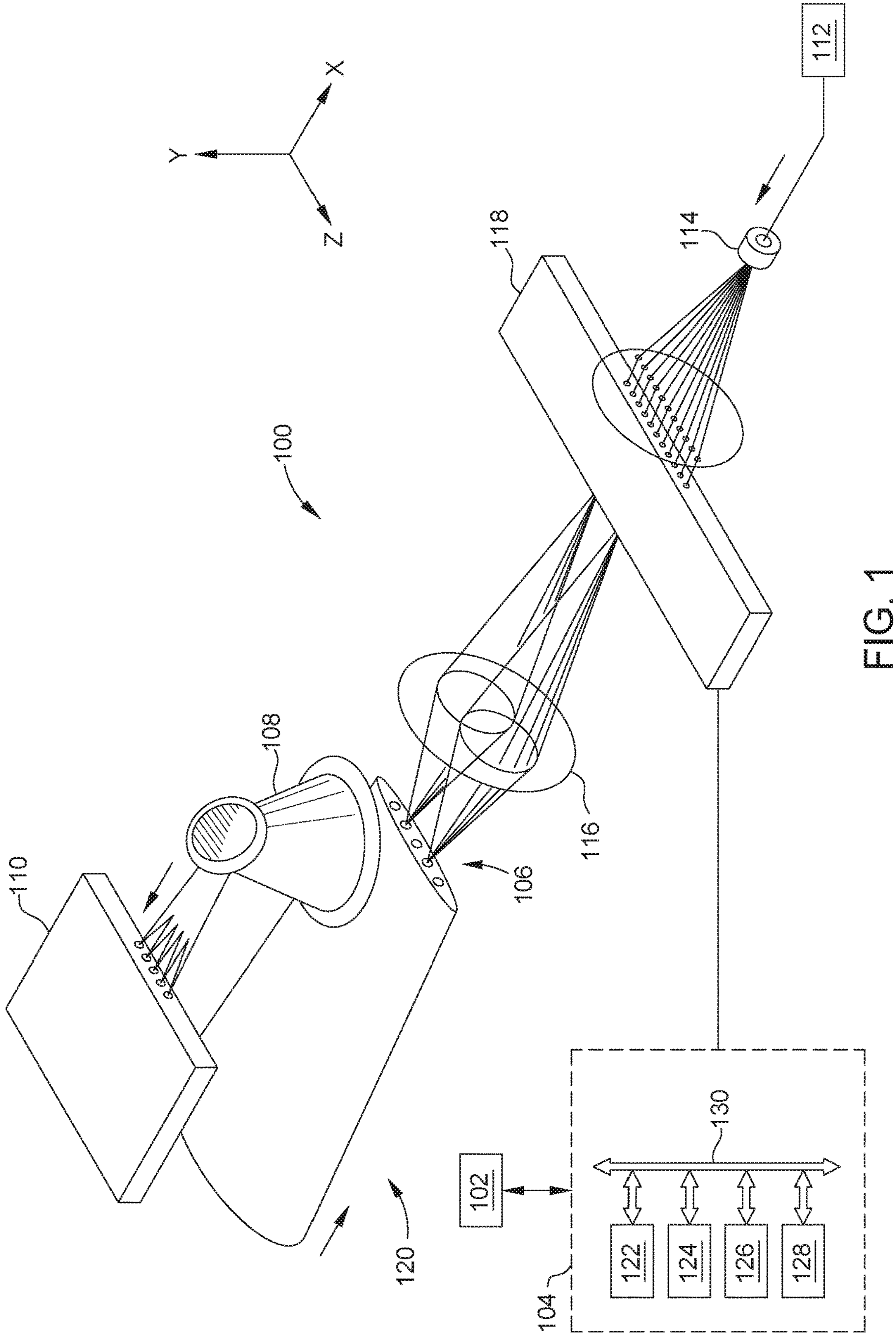
FIG. 1 is a schematic partial view of an ion trap quantum computing system according to aspects of this disclosure.

To facilitate understanding, identical reference numerals have been used, where possible, to designate identical elements that are common to the figures. In the figures and the following description, an orthogonal coordinate system including an X-axis, a Y-axis, and a Z-axis is used. The directions represented by the arrows in the drawing are assumed to be positive directions for convenience. It is contemplated that elements disclosed in some embodiments may be beneficially utilized on other implementations without specific recitation.

DETAILED DESCRIPTION

Embodiments described herein are generally related to a method of performing a computation in a quantum computing system, and more specifically, to a method of constructing control pulses that implement entangling gates in a quantum computing system that includes a group of trapped ions. The method can include a process of constructing the control pulses that implement stabilized entangling gate operations used in the computational process performed by a quantum computing system.

Embodiments of the disclosure include a quantum computing system that is able to perform a quantum computation process by use of a classical computer, a system controller, and a quantum processor. The classical computer performs supporting tasks including selecting a quantum algorithm to be used, computing quantum circuits to run the quantum algorithm, and outputting results of the execution of the quantum circuits by use of a user interface. A software program for performing the tasks is stored in a non-volatile memory within the classical computer. The quantum processor includes trapped ions that are coupled with various hardware, including lasers to manipulate internal hyperfine states (qubit states) of the trapped ions and photomultiplier tubes (PMTs) to read-out the internal hyperfine states (qubit states) of the trapped ions. The system controller receives from the classical computer instructions for controlling the quantum processor, and controls various hardware associated with controlling any and all aspects used to run the instructions for controlling the quantum processor, and transmits a read-out of the quantum processor and thus output of results of the read-out to the classical computer. In some embodiments, the classical computer will then utilize the computational results based on the output of results of the read-out to form a results-set that is then provided to a user in the form of results displayed on a user interface, stored in a memory and/or transferred to another computational device for solving technical problems.

I. General Hardware Configurations

FIG. 1 is a schematic partial view of an ion trap quantum computing system according to one embodiment. The ion trap quantum computing system 100 includes a classical (digital) computer 102, a system controller 104 and a quantum processor that is a group 106 of trapped ions (i.e., five shown) that extend along the Z-axis. Each ion in the group 106 of trapped ions is an ion having a nuclear spin I and an electron spin S such that a difference between the nuclear spin I and the electron spin S is zero, such as a positive ytterbium ion, $^{171}Yb^+$, a positive barium ion $^{133}Ba^+$, a positive cadmium ion $^{111}Cd^+$ or $^{113}Cd^+$, which all have a nuclear spin I=½ and the $^2S_{1/2}$ hyperfine states. In some embodiments, all ions in the group 106 of trapped ions are the same species and isotope (e.g., $^{171}Yb^+$). In some other embodiments, the group 106 of trapped ions includes one or more species or isotopes (e.g., some ions are $^{171}Yb^+$ and some other ions are $^{133}Ba^+$). In yet additional embodiments, the group 106 of trapped ions may include various isotopes of the same species (e.g., different isotopes of Yb, different isotopes of Ba). The ions in the group 106 of trapped ions are individually addressed with separate laser beams. The classical computer 102 includes a central processing unit (CPU), memory, and support circuits (or I/O). The memory is connected to the CPU, and may be one or more of a readily available memory, such as a read-only memory (ROM), a random-access memory (RAM), floppy disk, hard disk, or any other form of digital storage, local or remote. Software instructions, algorithms and data can be coded and stored within the memory for instructing the CPU. The support circuits (not shown) are also connected to the CPU for supporting the processor in a conventional manner. The support circuits may include conventional cache, power supplies, clock circuits, input/output circuitry, subsystems, and the like.

An imaging objective 108, such as an objective lens with a numerical aperture (NA), for example, of 0.37, collects fluorescence along the Y-axis from the ions and maps each ion onto a multi-channel photo-multiplier tube (PMT) 110 for measurement of individual ions. Non-copropagating Raman laser beams from a laser 112, which are provided along the X-axis, perform operations on the ions. A diffractive beam splitter 114 creates an array of static Raman beams 116 that are individually switched using a multi-channel acousto-optic modulator (AOM) 118 and is configured to selectively act on individual ions. A global Raman laser beam 120 is configured to illuminate all ions simultaneously. In some embodiments, individual Raman laser beams (not shown) each illuminate individual ions. The system controller (also referred to as a "RF controller") 104 controls the AOM 118 and thus controls laser pulses to be applied to trapped ions in the group 106 of trapped ions. The system controller 104 includes a central processing unit (CPU) 122, a read-only memory (ROM) 124, a random-access memory (RAM) 126, a storage unit 128, and the like. The CPU 122 is a processor of the system controller 104. The ROM 124 stores various programs and the RAM 126 is the working memory for various programs and data. The storage unit 128 includes a nonvolatile memory, such as a hard disk drive (HDD) or a flash memory, and stores various programs even if power is turned off. The CPU 122, the ROM 124, the RAM 126, and the storage unit 128 are interconnected via a bus 130. The system controller 104 executes a control program which is stored in the ROM 124 or the storage unit 128 and uses the RAM 126 as a working area. The control program will include software applications that include program code that may be executed by a processor in order to perform various functionalities associated with receiving and analyzing data and controlling any and all aspects of the methods and hardware used to create the ion trap quantum computer system 100 discussed herein.

Figure 2:
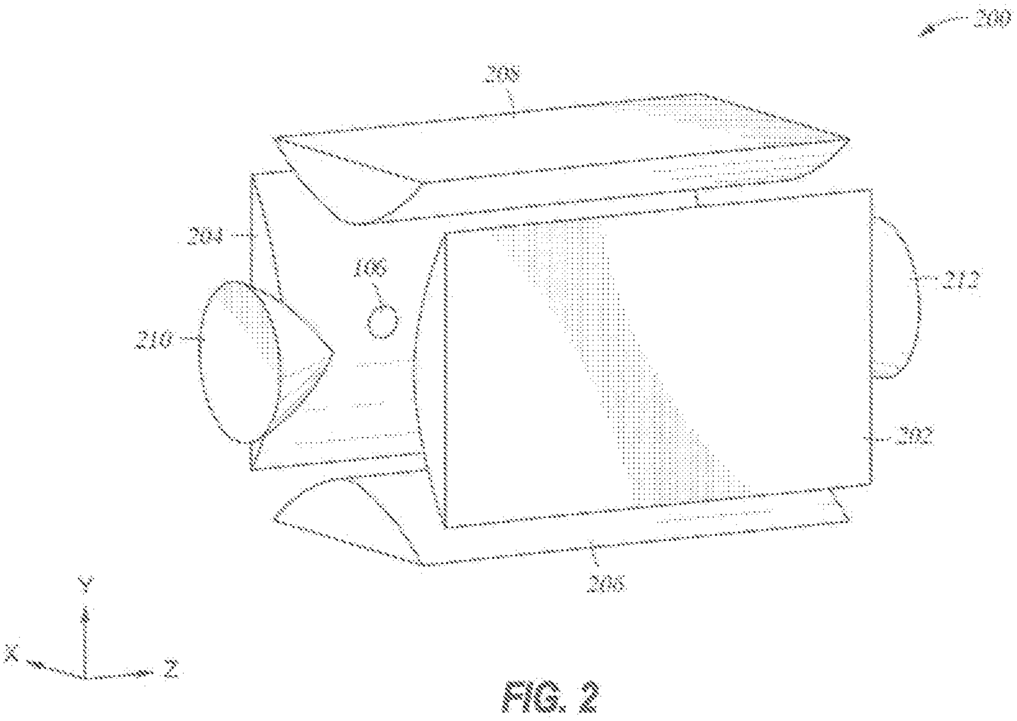
FIG. 2 depicts a schematic view of an ion trap for confining ions in a group according to aspects of this disclosure.

FIG. 2 depicts a schematic view of an ion trap 200 (also referred to as a Paul trap) for confining ions in the group 106 according to one embodiment. The confining potential is exerted by both a static (DC) voltage and a radio frequency (RF) voltage. A static (DC) voltage is applied to end-cap electrodes 210 and 212 to confine the ions along the Z-axis (also referred to as an "axial direction" or a "longitudinal direction"). The ions in the group 106 are nearly evenly distributed in the axial direction due to the Coulomb interaction between the ions. In some embodiments, the ion trap 200 includes four hyperbolically shaped electrodes 202, 204, 206, and 208 extending along the Z-axis.

During operation, a sinusoidal voltage $V_1$ (with an amplitude $V_{RF}/2$) is applied to an opposing pair of electrodes 202, 204 and a sinusoidal voltage $V_2$ with a phase shift of 180° from the sinusoidal voltage $V_1$ (and the amplitude $V_{RF}/2$) is applied to the other opposing pair of electrodes 206, 208 at a driving frequency $\omega_{RF}$, generating a quadrupole potential. In some embodiments, a sinusoidal voltage is only applied to one opposing pair of electrodes 202, 204, and the other opposing pair 206, 208 is grounded. The quadrupole potential creates an effective confining force in the X-Y plane perpendicular to the Z-axis (also referred to as a "radial direction" or "transverse direction") for each of the trapped ions, which is proportional to the distance from a saddle point (i.e., a position in the axial direction (Z-direction)) at which the RF electric field vanishes. The motion in the radial direction (i.e., direction in the X-Y plane) of each ion is approximated as a harmonic oscillation (referred to as secular motion) with a restoring force towards the saddle point in the radial direction and can be modeled by spring constants $k_x$ and $k_y$, respectively. In some embodiments, the spring constants in the radial direction are modeled as equal when the quadrupole potential is symmetric in the radial direction. However, undesirably in some cases, the motion of the ions in the radial direction may be distorted due to some asymmetry in the physical trap configuration, a small DC patch potential due to inhomogeneity of a surface of the electrodes, or the like and due to these and other external sources of distortion the ions may lie off-center from the saddle points. The Paul trap described herein is just one example of the types of traps that can be used as the ion trap 200. Other types of traps, including surface traps, can also be used for this purpose although their operation may be somewhat different.

Figure 3:
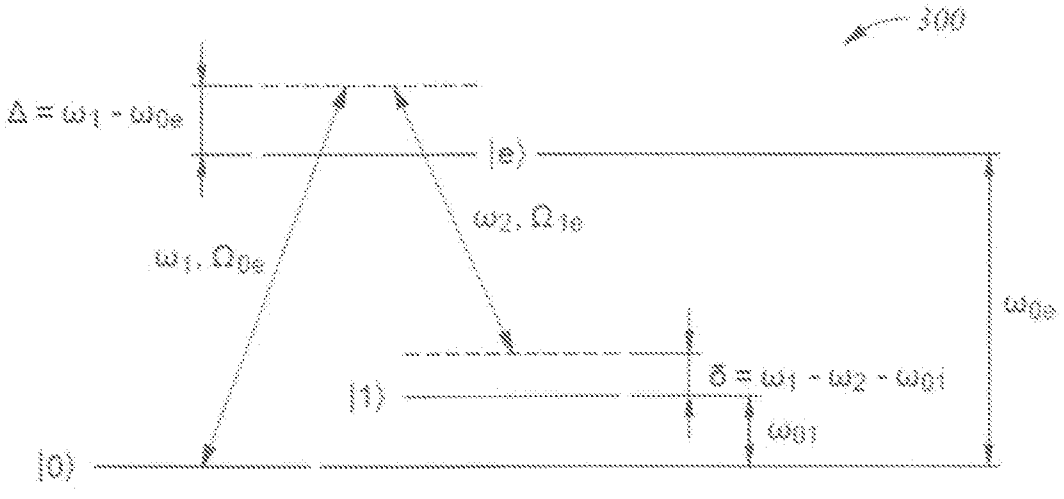
FIG. 3 depicts a schematic energy diagram of each ion in a group of trapped ions according to aspects of this disclosure.

FIG. 3 depicts a schematic energy diagram 300 of each ion in the group 106 of trapped ions according to one embodiment. Each ion in the group 106 of trapped ions is an ion having a nuclear spin I and an electron spin S such that a difference between the nuclear spin I and the electron spin S is zero. In one example, each ion may be a positive Ytterbium ion $^{171}Yb^+$, which has a nuclear spin I=½ and the $^2S_{1/2}$ hyperfine states (i.e., a multiplet of electronic states of which two are used as computational states) with an energy split corresponding to a frequency difference (referred to as a "carrier frequency") of $\omega_{01}/2\pi$=12.642812 GHz. In other examples, each ion may be a positive barium ion $^{33}Ba^+$, a positive cadmium ion $^{111}Cd^+$ or $^{113}Cd^+$, which all have a nuclear spin I=½ and the $^2S_{1/2}$ hyperfine states. A qubit is formed with two hyperfine states, denoted as $|0\rangle$ and $|1\rangle$, where the hyperfine ground state (i.e., the lowest energy state of the $^2S_{1/2}$ hyperfine states) is chosen to represent $|0\rangle$. Hereinafter, the terms "hyperfine states," "internal hyperfine states," and "qubit states" may be interchangeably used to represent $|0\rangle$ and $|1\rangle$. Further, the terms "trapped ions," "ions," and "qubits" may be interchangeable used. Each ion may be cooled (i.e., the kinetic energy of the ion may be reduced) to near the motional ground state $|0\rangle_p$ for any motional mode with no phonon excitation (i.e., $n_{ph}$=0) by known laser cooling methods, such as Doppler cooling or resolved sideband cooling, and then the qubit state prepared in the hyperfine ground state $|0\rangle$ by optical pumping. Here, $|0\rangle$ represents the individual qubit state of a trapped ion whereas $|0\rangle_p$ with the subscript denotes the motional ground state for a motional mode p of a group 106 of trapped ions.

An individual qubit state of each trapped ion may be manipulated by, for example, a mode-locked laser at 355 nanometers (nm) via the excited $^2P_{1/2}$ level (denoted as $|e\rangle$). As shown in FIG. 3, a laser beam from the laser may be split into a pair of non-copropagating laser beams (a first laser beam with frequency $\omega_1$ and a second laser beam with frequency $\omega_2$) in the Raman configuration, and detuned by a one-photon transition detuning frequency $\Delta=\omega_1-\omega_{0e}$ with respect to the transition frequency $\omega_{0e}$ between $|0\rangle$ and $|e\rangle$, as illustrated in FIG. 3. A two-photon transition detuning frequency $\delta$ includes adjusting the amount of energy that is provided to the trapped ion by the first and second laser beams, which when combined is used to cause the trapped ion to transfer between the hyperfine states $|0\rangle$ and $|1\rangle$. When the one-photon transition detuning frequency $\Delta$ is much larger than the two-photon transition detuning frequency (also referred to simply as "detuning frequency") $\delta=\omega_1-\omega_2-\omega_{01}$ (hereinafter denoted as $\pm\mu$, $\mu$ being a positive value), the single-photon Rabi frequencies $\Omega_{0e}(t)$ and $\Omega_{1e}(t)$ (which are time-dependent, and are determined by amplitudes and phases of the first and second laser beams), at which Rabi flopping between states $|0\rangle$ and $|e\rangle$ and between states $1\rangle$ and $1e\rangle$ respectively occur, and the spontaneous emission rate from the excited state $|e\rangle$, Rabi flopping between the two hyperfine states $|0\rangle$ and $|1\rangle$ (referred to as a "carrier transition") is induced at the two-photon Rabi frequency $\Omega(t)$. The two-photon Rabi frequency $\Omega(t)$ has an intensity (i.e., absolute value of amplitude) that is proportional to $\Omega_{0e}\Omega_{1e}/2\Delta$, where $\Omega_{0e}$ and $\Omega_{1e}$ are the single-photon Rabi frequencies due to the first and second laser beams, respectively. Hereinafter, this set of non-copropagating laser beams in the Raman configuration to manipulate internal hyperfine states of qubits (qubit states) may be referred to as a "composite pulse" or simply as a "pulse," described by a pulse function g(t) and the resulting time-dependent pattern of the two-photon Rabi frequency $\Omega(t)$ may be referred to as an "amplitude" of a pulse. The detuning frequency $\delta=\omega_1-\omega_2-\omega_{01}$ may be referred to as the detuning frequency of the composite pulse or the detuning frequency of the pulse. The amplitude of the two-photon Rabi frequency $\Omega(t)$, which is determined by amplitudes of the first and second laser beams, may be referred to as an "amplitude" of the composite pulse, such that the pulse function g(t) is now represented as $$g(t)=\Omega(t)\sin\left\{\int_0^t \mu(t')dt'+\Phi(t)\right\},$$

where $\Phi(t)$ is a "phase" of the composite pulse that may be time dependent.

It should be noted that the particular atomic species used in the discussion provided herein is just one example of atomic species which have stable and well-defined two-level energy structures when ionized and an excited state that is optically accessible, and thus is not intended to limit the possible configurations, specifications, or the like of an ion trap quantum computer according to the present disclosure. For example, other ion species include alkaline earth metal ions ($Be^+$, $Ca^+$, $Sr^+$, $Mg^+$, and $Ba^+$) or transition metal ions ($Zn^+$, $Hg^+$, $Cd^+$).

Figure 4:
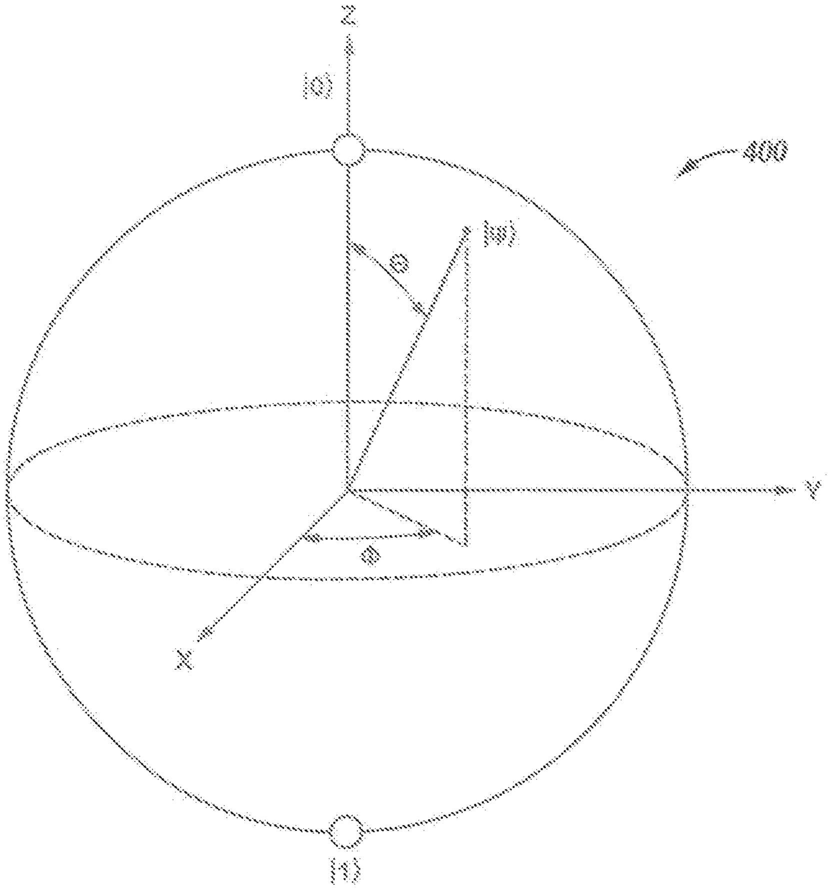
FIG. 4 depicts a qubit state of an ion represented as a point on the surface of the Bloch sphere.

FIG. 4 is provided to help visualize a qubit state of an ion represented as a point on the surface of the Bloch sphere 400 with an azimuthal angle <p and a polar angle $\theta$. Application of the composite pulse as described above, causes Rabi flopping between the qubit state $|0\rangle$ (represented as the north pole of the Bloch sphere) and $|1\rangle$ (the south pole of the Bloch sphere) to occur. Adjusting time duration and the composite pulse flips the qubit state from $|0\rangle$ to $|1\rangle$ (i.e., from the north pole to the south pole of the Bloch sphere), or the qubit state from $|1\rangle$ to $|0\rangle$ (i.e., from the south pole to the north pole of the Bloch sphere). This application of the composite pulse is referred to as a "$\pi$-pulse". Further, by adjusting time duration and the composite pulse, the qubit state $|0\rangle$ may be transformed to a superposition state $|0\rangle+1\rangle$, where the two qubit-states $|0\rangle$ and $|1\rangle$ are added and equally-weighted in-phase (a normalization factor of the superposition state is omitted hereinafter for convenience) and the qubit state $|1\rangle$ to a superposition state $|0\rangle-|1\rangle$, where the two qubit-states $|0\rangle$ and $|1\rangle$ are added equally-weighted but out of phase. This application of the composite pulse is referred to as a "$\pi$/2-pulse". More generally, a superposition of the two qubit-states $|0\rangle$ and $|1\rangle$ that are added and equally weighted is represented by a point that lies on the equator of the Bloch sphere. For example, the superposition states $|0\rangle\pm|1\rangle$ correspond to points on the equator with the azimuthal angle $\phi$ being zero and $\pi$, respectively. The superposition states that correspond to points on the equator with the azimuthal angle are denoted as $|0\rangle+e^{i\phi}|1\rangle$. Transformation between two points on the equator (i.e., a rotation about the Z-axis on the Bloch sphere) can be implemented by shifting phases of the composite pulse.

II. Entanglement Formation

Figure 5A:
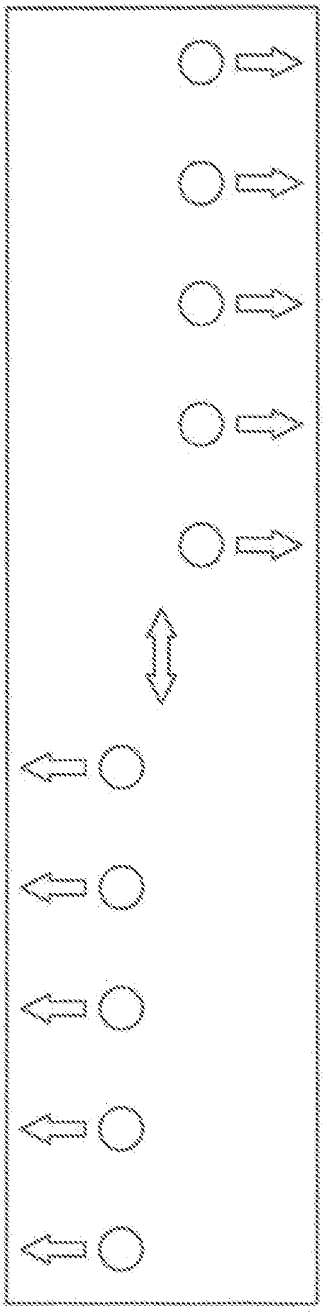
FIGS. 5A, 5B, and 5C depict a few schematic collective transverse motional mode structures of a group of five trapped ions.
Figure 5B:
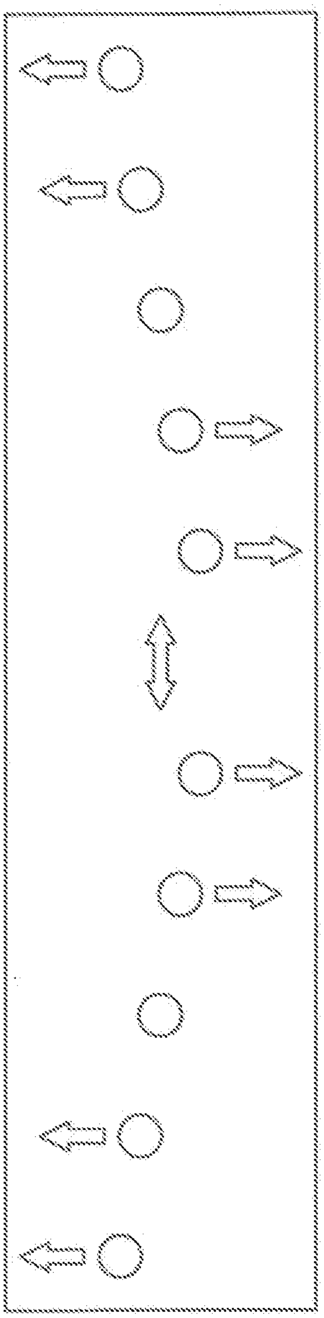
Figure 5C:
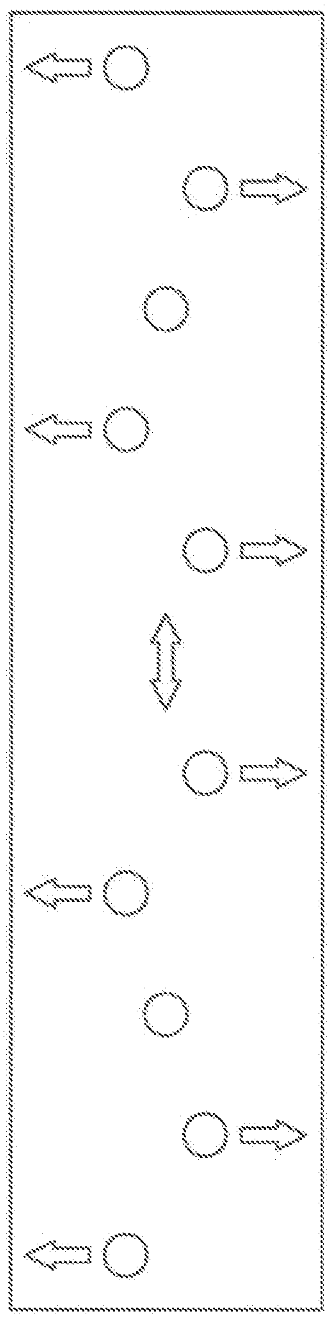

FIGS. 5A, 5B, and 5C depict a few schematic structures of collective transverse motional modes (also referred to simply as "motional mode structures") of a group 106 of five trapped ions, for example. Here, the confining potential due to a static voltage Vs applied to the end-cap electrodes 210 and 212 is weaker compared to the confining potential in the radial direction. The collective motional modes of the group 106 of trapped ions in the transverse direction are determined by the Coulomb interaction between the trapped ions combined with the confining potentials generated by the ion trap 200. The trapped ions undergo collective transversal motions (referred to as "collective transverse motional modes," "collective motional modes," or simply "motional modes"), where each mode has a distinct energy (or equivalently, a frequency) associated with it. A motional mode having the p-th lowest frequency is hereinafter referred to as $|n_{ph}\rangle_p$, where $n_{ph}$ denotes the number of motional quanta (in units of energy excitation, referred to as phonons) in the motional mode, and the number of motional modes P in a given transverse direction is equal to the number of trapped ions N in the group 106. FIGS. 5A-5C schematically illustrate examples of different types of collective transverse motional modes that may be experienced by five trapped ions that are positioned in a group 106. FIG. 5A is a schematic view of the common motional mode P having the highest energy, where P is the number of motional modes. In the common motional mode $|n_{ph}\rangle_P$, all ions oscillate in phase in the transverse direction. FIG. 5B is a schematic view of the tilt motional mode $|n_{ph}\rangle_{P-1}$ which has the second highest energy. In the tilt motional mode, ions on opposite ends move out of phase in the transverse direction (i.e., in opposite directions). FIG. 5C is a schematic view of the higher-order motional mode $|n_{ph}\rangle_{P-3}$ which has a lower energy than that of the tilt motional mode $|n_{ph}\rangle_{P-1}$, and in which the ions move in a more complicated mode pattern.

It should be noted that the particular configuration described above is just one among several possible examples of a trap for confining ions according to the present disclosure and does not limit the possible configurations, specifications, or the like of traps according to the present disclosure. For example, the geometry of the electrodes is not limited to the hyperbolic electrodes described above. In other examples, a trap that generates an effective electric field causing the motion of the ions in the radial direction as harmonic oscillations may be a multi-layer trap in which several electrode layers are stacked, and an RF voltage is applied to two diagonally opposite electrodes, or a surface trap in which all electrodes are located in a single plane on a chip. Furthermore, a trap may be divided into multiple segments, adjacent pairs of which may be linked by shuttling one or more ions or coupled by photon interconnects. A trap may also be an array of individual trapping regions arranged closely to each other on a micro-fabricated ion trap chip. In some embodiments, the quadrupole potential has a spatially varying DC component in addition to the RF component described above.

Figure 6A:
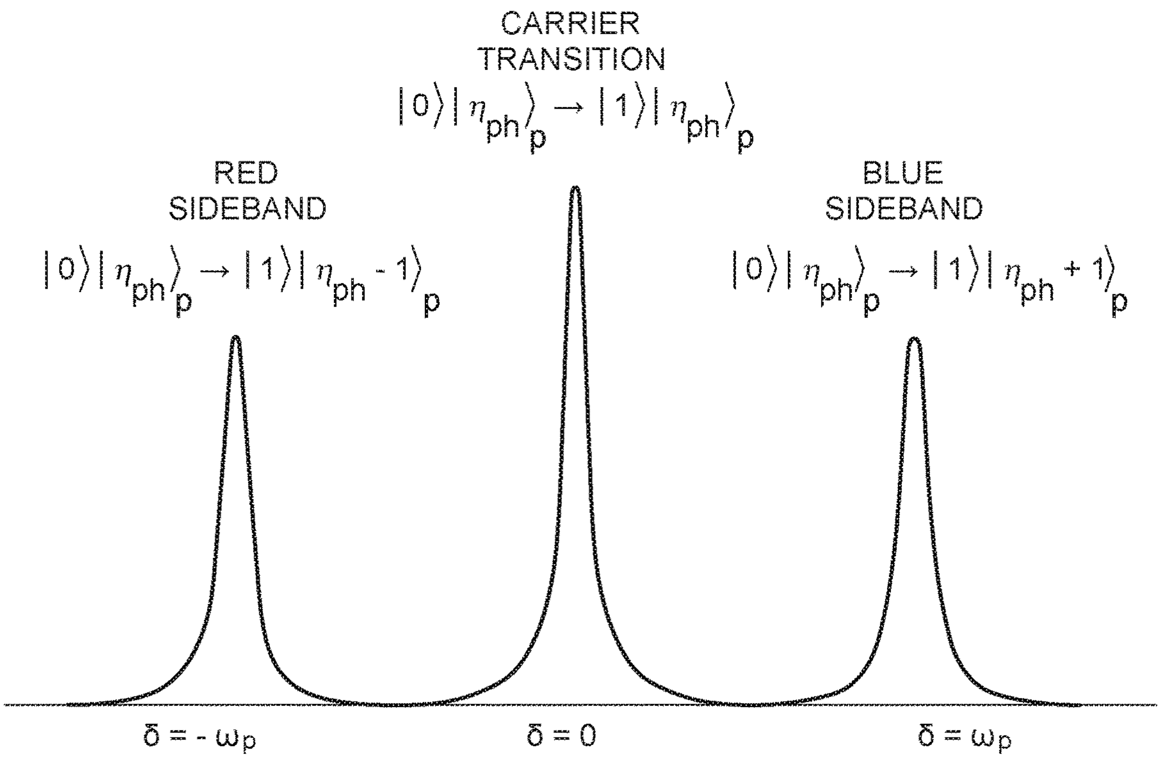
FIGS. 6A and 6B depict schematic views of a motional sideband spectrum of each ion and a motional mode according to aspects of this disclosure.
Figure 6B:
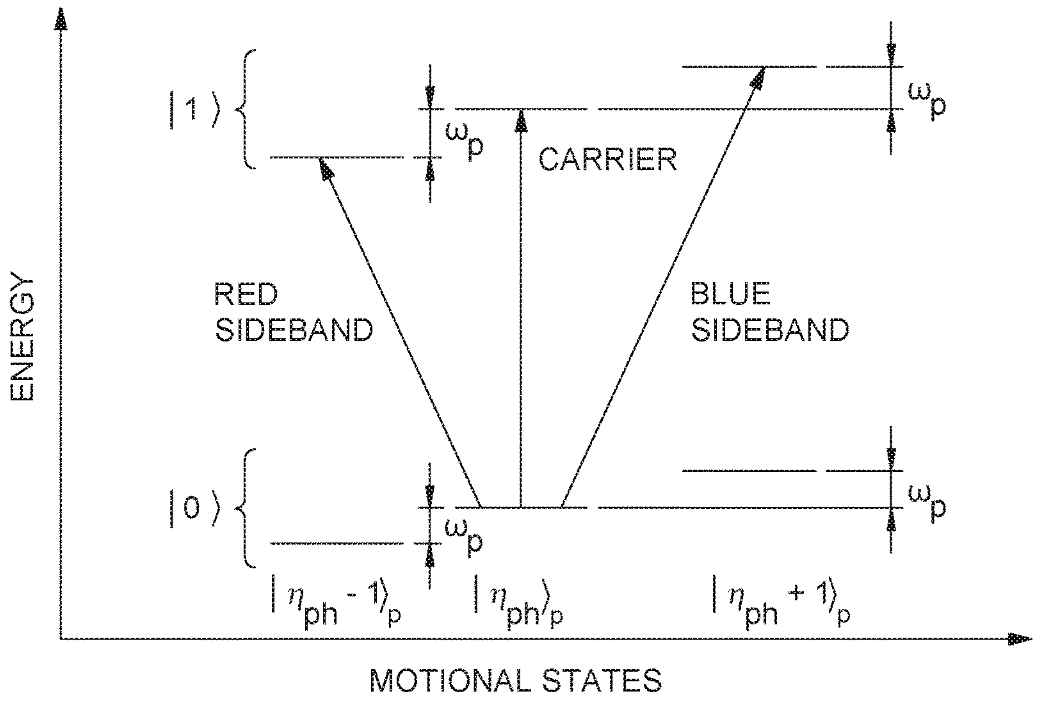

In an ion trap quantum computer, the motional modes may act as a data bus to mediate entanglement between two qubits and this entanglement is used to perform an XX gate operation. That is, each of the two qubits is entangled with the motional modes, and then the entanglement is transferred to an entanglement between the two qubits by using motional sideband excitations, as described below. FIGS. 6A and 6B schematically depict views of a motional sideband spectrum for an ion in the group 106 in a motional mode $|n_{ph}\rangle_p$ having frequency $\omega_p$ according to one embodiment. As illustrated in FIG. 6B, when the detuning frequency of the composite pulse is zero (i.e., the frequency difference between the first and second laser beams is tuned to the carrier frequency, $\delta=0$), simple Rabi flopping between the qubit states $|0\rangle$ and $|1\rangle$ (carrier transition) occurs. When the detuning frequency of the composite pulse is positive (i.e., the frequency difference between the first and second laser beams is tuned higher than the carrier frequency, $\delta=\mu>0$, referred to as a blue sideband, by $\omega_p$), Rabi flopping between combined qubit-motional states $|0\rangle n_{ph}\rangle_p$ and $|1\rangle|n_{ph}+1\rangle_p$ occurs (i.e., a transition from the p-th motional mode with $n_{ph}$-phonon excitations denoted by $|n_{ph}\rangle_p$ to the p-th motional mode with $n_{ph}+1$-phonon excitations denoted by $|n_{ph}+1\rangle_p$ occurs while the qubit state $|0\rangle$ flips to $|1\rangle$). When the detuning frequency of the composite pulse is negative (i.e., the frequency difference between the first and second laser beams is tuned lower than the carrier frequency by $\delta=-\mu<0$, referred to as a red sideband, by $\omega_p$), Rabi flopping between combined qubit-motional states $|0\rangle|n_{ph}\rangle_p$ and $|1\rangle|n_{ph}-1\rangle_p$ occurs (i.e., a transition from $|n_{ph}\rangle_p$ to $|n_{ph}-1\rangle_p$ with one less phonon excitations occurs while the qubit state $|0\rangle$ flips to $|1\rangle$). A $\pi/2$-pulse on the blue sideband applied to a qubit transforms the combined qubit-motional state $|0\rangle|n_{ph}\rangle_p$ into a superposition of $|0\rangle|n_{ph}\rangle_p$ and $|1\rangle|n_{ph}+1\rangle_p$. A $\pi/2$-pulse on the red sideband applied to a qubit transforms the combined qubit-motional state $|0\rangle|n_{ph}\rangle_p$ into a superposition of $|0\rangle n_{ph}\rangle_p$ and $|1\rangle|n_{ph}-1\rangle_p$. When the two-photon Rabi frequency $\Omega(t)$ is smaller as compared to the detuning frequency $\delta=\pm\mu$, the blue sideband transition or the red sideband transition may be selectively driven. Thus, a qubit can be entangled with a desired motional mode by applying the right type of pulse, such as a $\pi/2$-pulse, which can be subsequently entangled with another qubit, leading to an entanglement between the two qubits that is needed to perform an XX-gate operation in an ion trap quantum computer.

By controlling and/or directing transformations of the combined qubit-motional states as described above, an XX-gate operation may be performed on two qubits (i-th and j-th qubits). In general, the XX-gate operation (with maximal entanglement) respectively transforms two-qubit states $|0\rangle_i|0\rangle_j$, $|0\rangle_i|1\rangle_j$, $|1\rangle_i|0\rangle_j$, and $|1\rangle_i|1\rangle_j$ as follows:

$$|0\rangle_i|0\rangle_j \rightarrow 0\rangle_i|0\rangle - i|1\rangle_i|1\rangle_j$$

$$|0\rangle_i|1\rangle_j \rightarrow |0\rangle_i|1\rangle_j - i|1\rangle_i|0\rangle_j$$

$$|1\rangle_i|0\rangle_j \rightarrow |1\rangle_i|0\rangle_j - i|0\rangle_i|1\rangle_j$$

$$|1\rangle_i|1\rangle_j \rightarrow |1\rangle_i|1\rangle_j - i|0\rangle_i|0\rangle_j$$

For example, when the two qubits (i-th and j-th qubits) are both initially in the hyperfine ground state $|0\rangle$ (denoted as $|0\rangle_i|0\rangle_j$) and subsequently a $\pi/2$-pulse on the blue sideband is applied to the i-th qubit, the combined state of the i-th qubit and the motional mode $|0\rangle_i|n_{ph}\rangle_p$ is transformed into a superposition of $|0\rangle_i n_{ph}\rangle_p$ and $|1\rangle_i|n_{ph}+1)_p$, and thus the combined state of the two qubits and the motional mode is transformed into a superposition of $|0\rangle_L|1\rangle_j|n_{ph}\rangle_p$ and $|1\rangle_i|0\rangle_j|n_{ph}+1)_p$. When a $\pi/2$-pulse on the red sideband is applied to the j-th qubit, the combined state of the j-th qubit and the motional mode $|0\rangle|n_{ph}\rangle_p$ is transformed to a superposition of $|0\rangle_j|n_{ph}\rangle_p$ and $|1\rangle_j|n_{ph}-1\rangle_p$ and the combined state $|0\rangle_i|0\rangle_j|n_{ph}\rangle_p$ is transformed into a superposition of $|0\rangle_i|0\rangle_j|n_{ph}\rangle_p$ and $|0\rangle_i|1\rangle_j|n_{ph}-1)_p$.

Thus, applications of a $\pi/2$-pulse on the blue sideband on the i-th qubit and a $\pi/2$-pulse on the red sideband on the j-th qubit may transform the combined state of the two qubits and the motional mode $|0\rangle_i|0\rangle_j|n_{ph}\rangle_p$ into a superposition of $|0\rangle_i|0\rangle_j|n_{ph}\rangle_p$ and $|1\rangle i|1\rangle_j|n_{ph}\rangle_p$, the two qubits now being in an entangled state. For those of ordinary skill in the art, it should be clear that two-qubit states that are entangled with a motional mode having a different number of phonon excitations from the initial number of phonon excitations (i.e., $|1\rangle_i|0\rangle_j|n_{ph}+1\rangle_p$ and $|0\rangle_i|1\rangle_j|n_{ph}-1\rangle_p$) can be removed by a sufficiently complex pulse sequence, and thus the combined state of the two qubits and the motional mode after the XX-gate operation may be considered disentangled as the initial number of phonon excitations $n_{ph}$ in the p-th motional mode stays unchanged at the end of the XX-gate operation. Thus, qubit states before and after the XX-gate operation will be described below generally without including the motional modes.

More generally, the combined state of i-th and j-th qubits, transformed by the application of control pulses described by pulse functions $g_i(t)$ and $g_j(t)$, respectively, for duration $\tau$ (referred to as a "gate duration"), can be described in terms of a degree of entanglement $\chi_{ij}$ as follows:

$$|0\rangle_i|0\rangle_j \rightarrow \cos(2\chi_{ij})|0\rangle_i|0\rangle_j - i\sin(2\chi_{ij})|1\rangle_i|1\rangle_j$$

$$|0\rangle_i|1\rangle_j \rightarrow \cos(2\chi_{ij})|0\rangle_i|1\rangle_j - i\sin(2\chi_{ij})|1\rangle_i|0\rangle_j$$

$$|1\rangle_i|0\rangle_j \rightarrow \cos(2\chi_{ij})|1\rangle_i|0\rangle_j - i\sin(2\chi_{ij})|0\rangle_i|1\rangle_j$$

$$|1\rangle_i|1\rangle_j \rightarrow \cos(2\chi_{ij})|1\rangle_i|1\rangle_j - i\sin(2\chi_{ij})|0\rangle_i|0\rangle_j$$

where $$\chi_{ij} = \sum_{p=1}^{P} \eta_p^i \eta_p^j \int_0^{\tau} dt_2 \int_0^{t_2} dt_1 g_j(t_1) g_i(t_2) \sin[\omega_p(t_2 - t_1)],$$

and $$\eta_p^i$$

is the Lamb-Dicke parameter that quantifies the coupling strength between the i-th qubit and the p-th motional mode having the frequency $\omega_p$, and P is the number of the motional modes (equal to the number N of ions in the group 106).

The entanglement interaction between two qubits described above can be used to perform an XX-gate operation. The XX-gate operation (XX gate) along with single-qubit gate operations (R gates) forms a set of gates {R, XX} that can be used to build a quantum computer that is configured to perform desired computational processes. Among several known sets of logic gates by which any quantum algorithm can be decomposed, a set of logic gates, commonly denoted as {R, XX}, is native to a quantum computing system of trapped ions described herein. Here, the R gate corresponds to manipulation of individual qubit states of trapped ions, and the XX gate (also referred to as an "entangling gate") corresponds to manipulation of the entanglement of two trapped ions.

III. Construction of Control Pulses for Entangling Gate Operations

Quantum computation can be performed in a quantum computing system, such as the ion trap quantum computing system 100, using a set of quantum gate operations including single-qubit gate operations (R gates) and two-qubit gate operations, such as XX-gate operations (XX gates). Although the methods for applying such basic building blocks of quantum computation have been established, there are errors, which result from experimental parameter drift or fluctuations, such as the vibrational mode frequencies of an ion chain, in the hardware of the quantum computing system. These errors are mainly due to the lack of knowledge about the changes in the computing environment and the properties of quantum computing hardware within the quantum computing system. Thus, stabilizing gate operations, i.e., the task of computing and implementing control pulses in the quantum computing system to be robust against the errors is needed to provide scalable and reliable quantum computation results.

To perform an XX-gate operation between the i-th and j-th qubits, control pulses that satisfy the following five conditions need to be constructed and implemented. First, all trapped ions in the group 106 that are displaced from their initial positions as the motional modes are excited by the delivery of the control pulses must return to their initial positions at the end of the XX-gate operation. This first condition is referred to as the condition for returning of trapped ions to their original positions and momentum values, or the condition for closure of phase space trajectories, as described below in detail. Second, phase-space closure must be robust and stabilized against fluctuations in frequencies of the motional modes. This second condition is referred to as the condition for stabilization of phase-space closure. Third, the degree of entanglement $\chi_{ij}(\tau)$, generated between the i-th and j-th qubits by control pulses having pulse functions $g_i(t)$ and $g_j(t)$ must have a desired value $\theta_{ij}\neq 0$, for example, between 0 and $\pi/8$. This third condition is referred to as the condition for non-zero degree of entanglement. Fourth, the degree of entanglement $\chi_{ij}(\ )$ needs to be stabilized against fluctuations in frequencies of the motional modes $\omega_p$. This fourth condition is referred to as the condition for stabilization of the degree of entanglement. Fifth, the required laser power to implement control pulses having pulse functions $g_i(t)$ and $g_j(t)$ is minimized. This fifth condition is referred to as the condition for minimized power.

As described above, the first condition (also referred to as the condition for returning of trapped ions to their original positions and momentum values, or condition for closure of phase space trajectories) is that the trapped ions that are displaced from their initial positions as the motional modes are excited by the delivery of the control pulses return to their initial positions. Trapped ion number l, e.g., is displaced due to the excitation of the p-th motional mode during the gate duration $\tau$ and follows the trajectory $$\alpha_{l,p}(t) = -\eta_p^l \int_0^t g_l(t')\exp(i\omega_p t')dt'$$

in phase space (position and momentum space) of the p-th motional mode. Thus, for the group 106 of N trapped ions, the first condition $\alpha_{l,p}(i)=0$ (i.e., the trajectories are closed) must be imposed for all N motional modes (p=1, 2, . . . , N).

The second condition (also referred to as the condition for stabilization of phase-space closure) is that the first condition ($\alpha_{l,p}=0$ for l=i,j), generated by the control pulses having the pulse functions $g_i(t)$ and $g_j(t)$, is robust and stabilized against external errors, such as fluctuations in the frequencies $\omega_p$ of the motional modes. In the ion-trap quantum computer, or system 100, there can be fluctuations in the frequencies of the motional modes due to stray electric fields, build-up charges in the ion trap 200 caused, e.g., by photoionization, or temperature fluctuations. Typically, over a time span of minutes, the frequencies of the motional modes drift with excursions of $\Delta\omega_p/(2\pi)$ of the order of kHz. The condition for closure of phase-space trajectories based on the frequencies of the motional modes are therefore no longer satisfied when the frequencies of the motional modes have drifted to $\omega_p+\Delta\omega_p$, resulting in a reduction of the fidelity of the XX gate operation. It is known that the average infidelity 1−F of an XX gate operation between the i-th and j-th qubits, at zero temperature of the motional-mode phonons, is given by $$1 - F = 4/5\sum_p\left(|\alpha_{i,p}|^2 + |\alpha_{j,p}|^2\right).$$

This suggests that the XX-gate operation can be stabilized against a drift $\Delta\omega_p$ in the frequencies $\omega_p$ of the motional modes by requiring that the phase space trajectories $\alpha_{l,p}$ for l=i,j be stationary up to K-th order with respect to a drift $\Delta\omega_p$ in $\omega_p$, i.e., $$\frac{\partial^k \alpha_{l,p}(\tau)}{\partial \omega_p^k} = -\eta_p^l \int_0^\tau (it)^k g_k(t)\exp(i\omega_p t)dt = 0,$$

$$l = i, j,\ p = 1, 2, \ldots , N,$$

$$k = 1, 2, \ldots , K,$$

(referred to as K-th order stabilization), where K is an integer equal to larger than 1 and the maximal desired degree of stabilization of phase-space closure. The case K=0 may be included in the definition of K to denote the unstabilized case. Here, Lamb-Dicke parameter $$\eta_p^l$$

is treated as a constant since it changes only weakly with $\Delta\omega_p$. However, if desired for improved accuracy, the methods described in this disclosure can naturally accommodate the $\omega_p$ dependence of Lamb-Dicke parameter $$\eta_p^l.$$

The control pulses computed by requiring this condition for stabilization can perform an XX gate operation that, with respect to the condition for closure of phase-space trajectories, is resilient against a drift $\Delta\omega_p$ in the frequencies $\omega_p$ of the motional modes. It is to be noted that similar stability can be implemented against other types of parameter noise such as gate-time errors. It applies to stabilization against all parameters that can be brought into linear matrix form akin to the above-described stabilization against mode-frequency drifts.

The third condition (also referred to as the condition for non-zero degree of entanglement) is that the degree of entanglement $\chi_{ij}(\tau)$ generated between the i-th and j-th qubits by the non-zero control pulses having the pulse functions $g_i(t)$ and $g_j(t)$ has a desired non-zero value $\theta_{ij}\neq 0$. The transformations of the combined state of the i-th and j-th qubits described above correspond to the XX-gate operation with maximal entanglement when $\theta_{ij}=\pm\pi/8$.

Pulse construction and implementation of the fourth and fifth conditions, i.e., the condition for stabilization of the degree of entanglement and power minimization, is described in detail below. As an example, a pulse function $g_l(t)$ of a control pulse to be applied to the l-th qubit (l=i,j) is expanded in a Fourier-sine series as $$g_l(t) = \sum_n A_{ln}\sin(2\pi nt/\tau),$$

where $A_{ln}$ are Fourier coefficients and n is the basis summation index. Then, the first condition becomes $$\alpha_{l,p}(\tau) = -\eta_p^l \sum_n M_{pn}A_{ln},\quad M_{pn} = \int_0^\tau \sin(2\pi nt/\tau\exp(i\omega_p t)dt.$$

It should be clear to those skilled in the art that likewise expressions can readily be obtained for the second condition, which may then be added as additional rows to the matrix $M_{pn}$.

Null-space vectors $\vec{A}^\alpha$, $\alpha=1, 2, \ldots, N_0$ (each of which has elements $$A_1^\alpha, A_2^\alpha, \ldots)$$

of the matrix $M_{pn}$, when used as the Fourier coefficients $A_{ln}$ of the pulse function $g_l(t)$, satisfy the first and second conditions. A linear combination $$\vec{A}_l = \sum_{\alpha=1}^{N_0} \Lambda_{l\alpha}\vec{A}^\alpha$$

of the null-space vectors $\vec{A}^\alpha$, which has elements $$\sum_{\alpha=1}^{N_0} \Lambda_{l\alpha}A_1^\alpha,\ \sum_{\alpha=1}^{N_0} \Lambda_{l\alpha}A_2^\alpha,\ \ldots,$$

also satisfies the first and second conditions. The coefficients $\Lambda_{l\alpha}$ in the linear combination $\vec{A}_l$ are determined such that the remaining third, fourth, and fifth conditions are satisfied.

Using the linear combination $\vec{A}_l$ of the null-space vectors $\vec{A}^\alpha$, the degree of entanglement becomes $$\chi_{ij} = \sum_{n,m} A_{in}S_{nm}^{ij}A_{jn} = \vec{A}_i^T S^{ij}\vec{A}_j,$$

where $$S_{nm}^{ij} = \sum_p \eta_p^i\eta_p^j \int_0^\tau dt_2 \int_0^{t_2} dt_1 \sin\left(2\pi m\frac{t_1}{\tau}\right)\sin\left(2\pi n\frac{t_2}{\tau}\right)\sin[\omega_p(t_2-t_1)].$$

Note the matrix $$S_{nm}^{ij}$$

is symmetric in both the lower indices n and m and the upper indices i and j. The third condition is satisfied by choosing the coefficients $\Lambda_{l\alpha}$ (l=i,j) of the linear combination $$\vec{A}_l = \sum_{\alpha=1}^{N_0} \Lambda_{l\alpha}\vec{A}^\alpha$$

of the null-space vectors $\vec{A}^\alpha$ such that $\chi_{ij}$ is non-zero. For example, $\chi_{ij}=\pi/8$ corresponds to maximal entanglement.

In another representation, the degree of entanglement $\chi_{ij}$ can be written using power vectors $\vec{B}_i$ and $\vec{B}_j$ of the pulse functions $g_i(t)$ and $g_j(t)$ as $$\chi_{ij} = \vec{B}_i^T V^{ij}\vec{B}_j,$$

where ($\hat{P}^0$ is the null-space projector)

$$V^{ij} = \hat{P}^0 S^{ij}\hat{P}^0;\ \vec{B}_i = \hat{P}^0\vec{A}_i;\ \hat{P}^0 = \sum_{\alpha=1}^{N_0} \vec{A}^\alpha\vec{A}^{\alpha T}.$$

The fourth condition (i.e., the condition for stabilization of the degree of entanglement) suggests that the degree of entanglement can be stabilized against a drift $\Delta\omega_p$ in the frequencies $\omega_p$ of the motional modes by requiring that the degree of entanglement $\chi_{ij}$ be stationary up to Q-th order with respect to a drift $\Delta\omega_p$ in $\omega_p$, i.e., $$\frac{\partial^q \chi_{ij}}{\partial \omega_p^q} = \vec{B}_i^T R^{ij;pq} \vec{B}_j = 0,\ p = 1, \ldots, N,$$

$$q = 1, 2, \ldots, Q,\ R^{ij;pq} = \frac{\partial^q V_{ij}}{\partial \omega_p^q},$$

(referred to as Q-th order stabilization), where Q is an integer equal to or larger than 1 and the maximal desired degree of stabilization of the degree of entanglement $\chi_{ij}$. The case Q=0 may be included in the definition of Q to denote the unstabilized case. The fourth condition is satisfied by choosing the coefficients $\Lambda_{l\alpha}$ (l=i,j) of the linear combination $$\vec{A}_l = \sum_{\alpha=1}^{N_0} \Lambda_{l\alpha} \vec{A}^\alpha$$

of the null-space vectors $\vec{A}^\alpha$ satisfying $$\frac{\partial^q \chi_{ij}}{\partial \omega_p^q} = 0.$$

The fifth condition (i.e., the condition for minimized power) can be written in terms of the power vectors $\vec{B}_i$ and $\vec{B}_j$ as minimizing $$\vec{B}_i^2 + \vec{B}_j^2.$$

The fifth condition is satisfied by choosing the coefficients $\Lambda_{l\alpha}$ (l=i,j) of the linear combination $$\vec{A}_l = \sum_{\alpha=1}^{N_0} \Lambda_{l\alpha} \vec{A}^\alpha$$

of the null-space vectors $\vec{A}^\alpha$ such that $$\vec{B}_i^2 + \vec{B}_j^2$$

is minimized.

In the embodiments described herein, a function G defined by $$G = \vec{B}_i^2 + \vec{B}_j^2 - \lambda\left(\vec{B}_i^T V^{ij} \vec{B}_j - \theta_{ij}\right) - \sum_{p=1}^{N} \sum_{q=1}^{Q} \mu_p^q \vec{B}_i^T R^{ij;pq} \vec{B}_j,$$

can be minimized with respect to the power vectors $\vec{B}_i$ and $\vec{B}_j$ to choose the coefficients $\Lambda_{l\alpha}$ (l=i,j) of the linear combination $$\vec{A}_l = \sum_{\alpha=1}^{N_0} \Lambda_{l\alpha} \vec{A}^\alpha$$

of the null-space vectors $\vec{A}^\alpha$ that satisfy the fifth condition while satisfying the third and the fourth conditions, which are included in the function G via the Lagrangian multipliers λ and $$\mu_p^q.$$

Note the minimization of the function G, a quadratic function, subject to quadratic constraints, is an NP-hard problem. For those of ordinary skill in the art, it should be clear that an efficient, exact solution to an NP-hard problem is not known in general.

The G-minimization problem can however be approximately solved efficiently using a linear protocol. So long as the approximation is good, the solution results in excellent two-qubit gate operations. In the embodiments described herein, an efficient, linear method 800 for minimizing the function G is used as an example.

The linear combinations $$\vec{A}_i^0$$

(having elements $$A_{i1}^0, A_{i2,}^0, \ldots)$$

and $$\vec{A}_j^0$$

(having elements $$A_{j1}^0, A_{j2,}^0, \ldots\ )$$

that minimize the function G (i.e., satisfying the third, fourth, and fifth conditions) are used to compute the pulse functions $g_i(t)$ and $g_j(t)$ as $$g_i(t) = \sum_n A_{in}^0 \sin(2\pi nt/\tau),\ g_j(t) = \sum_n A_{jn}^0 \sin(2\pi nt/\tau),$$

which are to be applied to the i-th and j-th qubits, respectively, to entangle the i-th and j-th qubits.

Figure 7:
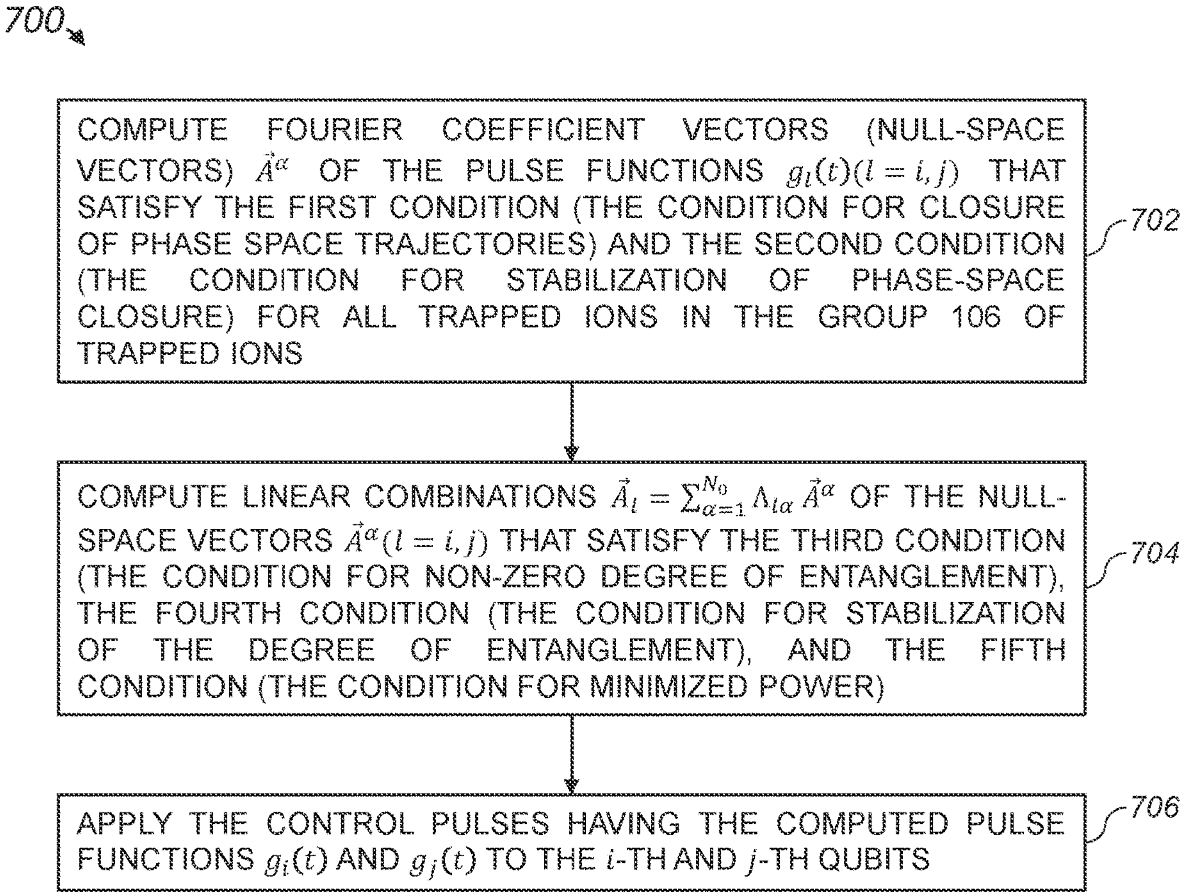
FIG. 7 depicts a flow chart illustrating a method of computing power optimal control pulses that are used to perform an XX-gate operation, according to aspects of this disclosure.

FIG. 7 depicts a flow chart illustrating the method 700 of computing power optimal control pulses that are used to perform an XX-gate operation on the i-th and j-th qubits, according to one embodiment. In this example, the group 106 of trapped ions is a quantum processor. The software program(s) within a classical computer, such as the classical computer 102 are used to compute power optimal control pulses, and a system controller, such as the system controller 104, is used to control applications of the power optimal pulses computed during the performance of the method 700, to the two qubits within the quantum processor. The method 700 includes an approximate algorithm to compute pulse functions $g_i(t)$ and $g_j(t)$ of the control pulses that are to be applied to the i-th and j-th qubits, respectively, to entangle the i-th and j-th qubits.

The method 700 begins with block 702, in which, by the classical computer, Fourier coefficient vectors (also referred to as null-space vectors) $\vec{A}^\alpha$ of the pulse functions $g_l(t)$(l=i,j)

that satisfy the first condition (i.e., the condition for closure of phase space trajectories) and the second condition (i.e., the condition for stabilization of phase-space closure) for all trapped ions in the group 106 of trapped ions are computed.

In block 704, by the classical computer, linear combinations $$\vec{A}_l = \sum_{\alpha=1}^{N_0} \Lambda_{l\alpha} \vec{A}^{\alpha} \text{ of}$$

the null-space vectors $\vec{A}^{\alpha}$ (l=i,j) that satisfy the third condition (i.e., the condition for non-zero degree of entanglement), the fourth condition (i.e., the condition for stabilization of the degree of entanglement), and the fifth condition (i.e., the condition for minimized power) are computed, as further discussed below. The computed linear combinations ($\vec{A}_l$, l=i,j) are used to compute pulse functions $g_i(t)$ and $g_j(t)$ of the control pulses that are to be applied to the i-th and j-th qubits, respectively, to entangle the i-th and j-th qubits.

In block 706, by the system controller, the control pulses having the computed pulse functions $g_i(t)$ and $g_j(t)$ are applied to the i-th and j-th qubits. The application of the computed control pulses to the two qubits during block 706 implements an XX gate operation among the series of universal gate {R, XX} operations into which a selected quantum algorithm is decomposed. All the XX-gate operations (XX gates) in the series of universal gate {R, XX} operations are implemented by the method 700 described above, along with single-qubit operations (R gates), to run the selected quantum algorithm. At the end of running the selected quantum algorithm, the population of the qubit states (trapped ions) within the quantum processor (the group 106 of trapped ions) is measured (read-out) by the system controller, using the imaging objective 108 and mapped onto the PMT 110, so that the results of quantum computation(s) within the selected quantum algorithm can be determined and provided as input to the classical computer. The results of the quantum computation(s) can then be used by the classical computer to perform a desired activity or obtain solutions to problems that are typically not ascertainable, or ascertainable in a reasonable amount of time, by the classical computer alone. The problems that are known to be intractable or unascertainable by the conventional computers (i.e., classical computers) today and may be solved by use of the results obtained from the performed quantum computations may include but are not limited to simulating properties of complex molecules and materials, factoring large integers, and searching large databases.

Figure 8:
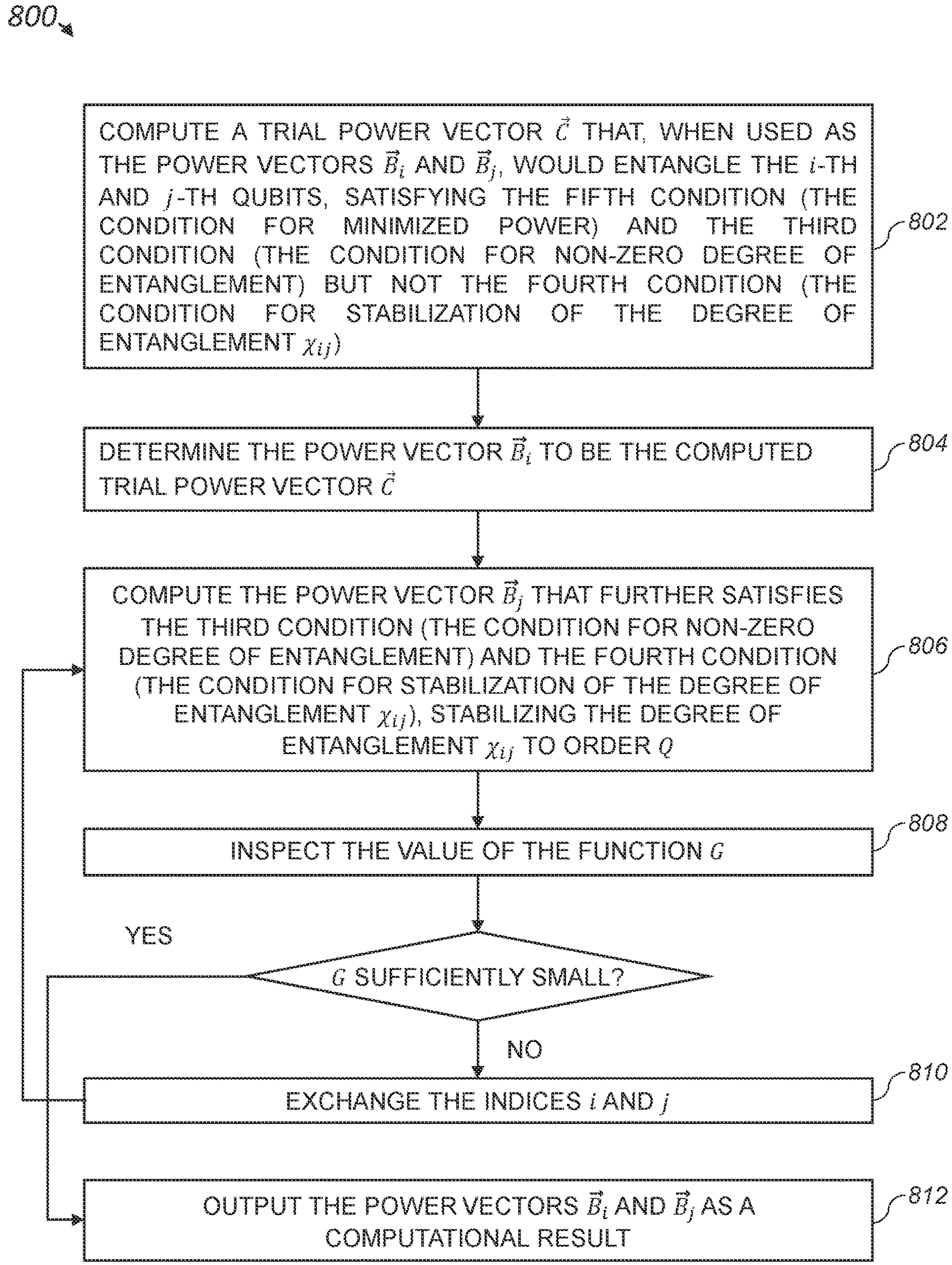
FIG. 8 depicts a flowchart illustrating a method 800 of computing control pulses that satisfy the third, fourth, and fifth conditions, according to aspects of this disclosure.

FIG. 8 depicts a flowchart illustrating a method 800 of computing control pulses that satisfy the third, fourth, and fifth conditions, as shown in block 704 above.

In block 802, by the classical computer, a trial power vector U is computed that, when used as the power vectors $\vec{B}_i$ and $\vec{B}_j$, would entangle the i-th and j-th qubits, satisfying the third condition (i.e., the condition for non-zero degree of entanglement) and the fifth condition (i.e., the condition for minimized power) but not satisfying the fourth condition (i.e., the condition for stabilization of the degree of entanglement $\chi_{ij}$). The trial power vector $\vec{C}$ can be determined as $$\vec{C} = |\theta_{ij}/v|^{1/2}\vec{\gamma},\ V^{ij}\vec{\gamma} = v\vec{\gamma},\ \|\vec{\gamma}\| = 1,$$

where $\vec{\gamma}$ is the normalized eigenvector of $V^{ij}$ that corresponds to the largest-modulus eigenvalue v.

In block 804, by the classical computer, the power vector $\vec{B}_i$ is determined to be the computed trial power vector $\vec{C}$.

In block 806, by the classical computer, the power vector $\vec{B}_j$ that further satisfies the fourth condition (i.e., the condition for stabilization of the degree of entanglement $\chi_{ij}$), stabilizing the degree of entanglement $\chi_{ij}$ to order Q, is computed. The power vector $\vec{B}_j$ (corresponding to the linear combination $$\vec{A}_j = \sum_{\alpha=1}^{N_0} \Lambda_{j\alpha} \vec{A}^{\alpha}$$

of the null-space vectors $\vec{A}^{\alpha}$) can be varied and determined to minimize the function F (making use of the symmetry of $V^{ij}$ and $R^{ij;pq}$)

$$F = \vec{B}_j^2 - \lambda \vec{B}_j^T V^{ij} \vec{B}_i - \sum_{p=1}^{N}\sum_{q=1}^{Q} \mu_p^q \vec{B}_j^T R^{ij;pq} \vec{B}_i$$

while fixing the power vector $\vec{B}_i$ (corresponding to the linear combination $$\vec{A}_i = \sum_{\alpha=1}^{N_0} \Lambda_{i\alpha} \vec{A}^{\alpha}$$

of the null-space vectors $\vec{A}^{\alpha}$ and, in the first iteration of the method, equal to the computed trial power vector $\vec{C}$, i.e., corresponding to the trial linear combination $$\vec{C} = \sum_{\alpha=1}^{N_0} \Lambda_{\alpha}^{C} \vec{A}^{\alpha} \text{ of}$$

the null-space vectors $\vec{A}^{\alpha}$). That is, variation of the function F with respect to the power vector $\vec{B}_j$ is zero, $$\vec{0} = \frac{\partial F}{\partial \vec{B}_j} = 2\vec{B}_j - \lambda V^{ij}\vec{B}_i - \sum_{p=1}^{N}\sum_{q=1}^{Q} \mu_p^q R^{ij;pq} \vec{B}_i.$$

This equation can be solved for $$\vec{B}_j = \frac{1}{2}\lambda V^{ij}\vec{B}_i + \frac{1}{2}\sum_{p=1}^{N}\sum_{q=1}^{Q} \mu_p^q R^{ij;pq} \vec{B}_i.$$

The third and fourth conditions then become the following equations for the Lagrangian multipliers λ and $$\mu_p^q:$$

$$\theta_{ij} = \left(\frac{1}{2}\vec{B}_i^T V^{ij} V^{ij} \vec{B}_i\right)\lambda + \sum_{p=1}^{N}\sum_{q=1}^{Q} \left(\frac{1}{2}\vec{B}_i^T V^{ij} R^{ij;pq} \vec{B}_i\right)\mu_p^q,$$

-continued $$0 = \left(\frac{1}{2}\vec{B}_i^T R^{ij;rs} V^{ij} \vec{B}_i\right)\lambda + \sum_{p=1}^{N} \sum_{q=1}^{Q} \left(\frac{1}{2}\vec{B}_i^T R^{ij;rs} R^{ij;pq} \vec{B}_i\right)\mu_p^q;$$

$$r = 1, 2, \ldots, N, s = 1, 2, \ldots, Q.$$

This is an inhomogeneous system of equations for the Lagrangian multipliers that has a unique solution as long as the determinant of the matrix of coefficients is nonzero. In the unlikely event that the determinant is zero, or close to zero, a slight readjustment of the gate time $\tau$ (not shown) can be used to make the determinant nonzero. The resulting Lagrangian multipliers $\lambda$ and $$\mu_p^q$$

determined as the unique solution can be used to determine the power vector $\vec{B}_j$.

In block 808, by the classical computer, the value of the function G is inspected. If the function G is deemed sufficiently small, the iteration terminates, and control is transferred to block 812. If the function G is not sufficiently small, control is transferred to block 810.

In block 810, the method 800 returns to block 806 while exchanging the indices i and j. That is, the power vector $\vec{B}_j$ (corresponding to the linear combination $$\vec{A}_j = \sum_{\alpha=1}^{N_0} \Lambda_{j\alpha} \vec{A}^\alpha$$

of the null-space vectors $\vec{A}^\alpha$) replaces the power vector $\vec{B}_i$ (corresponding to the linear combination $$\vec{A}_i = \sum_{\alpha=1}^{N_0} \Lambda_{i\alpha} \vec{A}^\alpha$$

of the null-space vectors $\vec{A}^\alpha$), which is now kept constant in another iteration of the algorithm above.

In block 812, by the classical computer, the power vectors $\vec{B}_i$ and $\vec{B}_j$ are output as a computational result.

The computational result of the power vectors $\vec{B}_i$ and $\vec{B}_j$ can be used to determine the linear combination $\vec{A}_i$ of the null-space vectors $$\vec{A}_i^\alpha$$

and the linear combination $\vec{A}_j$ of the null-space vectors $$\vec{A}_i^\alpha,$$

which can further be used to compute the pulse functions $g_i(t)$ and $g_j(t)$.

It should be noted that iterating the protocol in the method 800 does not change the fact that the protocol is linear. Iteration has two main effects. It reduces the power requirement and substantially improves the stabilization of the degree of entanglement. In another aspect, iteration can also improve the numerical instability of numerical linear systems solvers run on the classical computer.

IV. Examples

In the following, example results for stabilized entangling operations are shown. In the examples disclosed herein, the control pulses determined are executed on a quantum processor 106 that includes seven trapped ions in the ion trap quantum computing system 100. The control pulses are determined for ions i=1 and j=2. Motional mode frequencies $\omega_p$ and the Lamb-Dicke parameters $$\eta_p^i$$

are shown in Tables 1 and 2, respectively. A gate duration $\tau$ of 300 μs and the phase-space closure stabilization order K=0 are used for the example control pulses to be discussed below.

TABLE 1

Motional-mode frequencies.

| mode#p | $\omega_p/(2\pi)$in MHz |
|---|---|
| p = 1 | 2.9526 |
| p = 2 | 2.9660 |
| p = 3 | 2.9844 |
| p = 4 | 3.0063 |
| p = 5 | 3.0292 |
| p = 6 | 3.0493 |
| p = 7 | 3.0597 |

TABLE 2

Lamb-Dicke parameters.

| ion# | p = 1 | p = 2 | p = 3 | p = 4 | p = 5 | p = 6 | p = 7 |
|---|---|---|---|---|---|---|---|
| i = 1 | 0.0103 | 0.0223 | −0.0349 | 0.0464 | 0.0550 | −0.0585 | 0.0414 |
| i = 2 | −0.0335 | −0.0563 | 0.0564 | −0.0307 | 0.0099 | −0.0449 | 0.0414 |
| i = 3 | 0.0548 | 0.0504 | 0.0076 | −0.0549 | −0.0368 | −0.0243 | 0.0414 |
| i = 4 | −0.0631 | 0.0000 | −0.0582 | 0.0000 | −0.0564 | 0.0000 | 0.0414 |
| i = 5 | 0.0548 | −0.0504 | 0.0076 | 0.0549 | −0.0368 | 0.0243 | 0.0414 |
| i = 6 | −0.0335 | 0.0563 | 0.0564 | 0.0307 | 0.0099 | 0.0449 | 0.0414 |
| i = 7 | 0.0103 | −0.0223 | −0.0349 | −0.0464 | 0.0550 | 0.0585 | 0.0414 |

Figure 9:
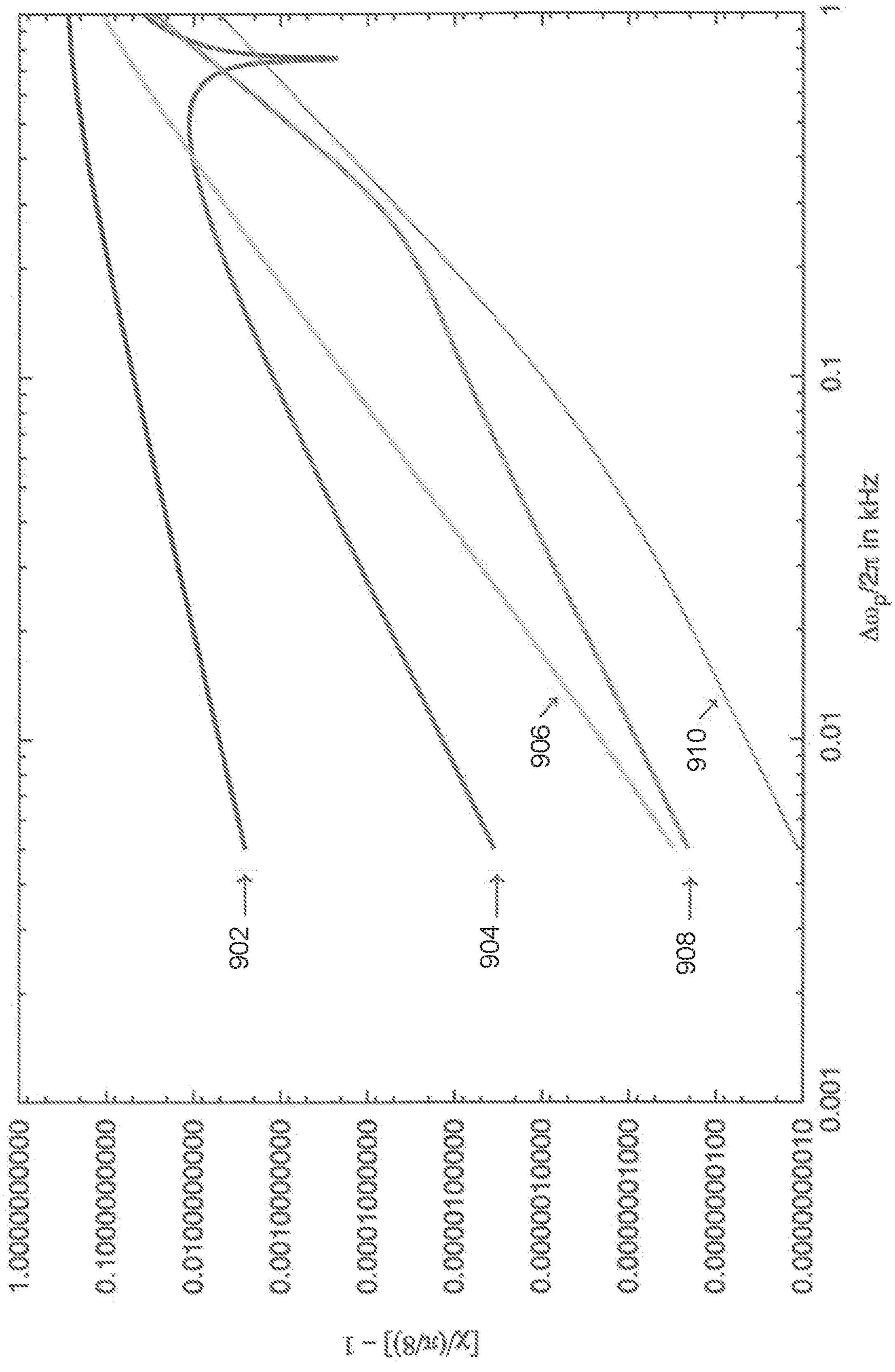
FIG. 9 depicts an example of stabilized entangling operation results of the degree of entanglement as a function of in-tandem motional mode frequency drifts according to aspects of this disclosure.

FIG. 9 depicts example stabilized entangling operation results of the degree of entanglement $\chi_{ij}$ as a function of in-tandem motional mode frequency drifts $\omega_p \to \omega_p + \Delta\omega_p$ with $0 < \Delta\omega_p < 2\pi \times 1$ kHz. Line 902 is the unstabilized result for Q=0. It can be seen that for typical motional-mode frequency drifts $\Delta\omega_p$ of 2$\pi\times$1 kHz, the degree of entanglement drifts by more than 30%, which is not acceptable for the operation of a quantum computing system 100. The Q=0 result 902 illustrates that the stabilization is a must, without which a quantum computation cannot succeed over longer intervals of time. The line 904 corresponds to Q=1 (linear stabilization). It is seen that even Q=1 already significantly stabilizes the degree of entanglement $\chi_{ij}$ over the full range of 1 kHz mode drift. Even better results are obtained for Q=2 (quadratic stabilization, line 906), Q=3 (cubic stabilization, line 908), and Q=4 (quartic stabilization, line 910).

Figure 10:
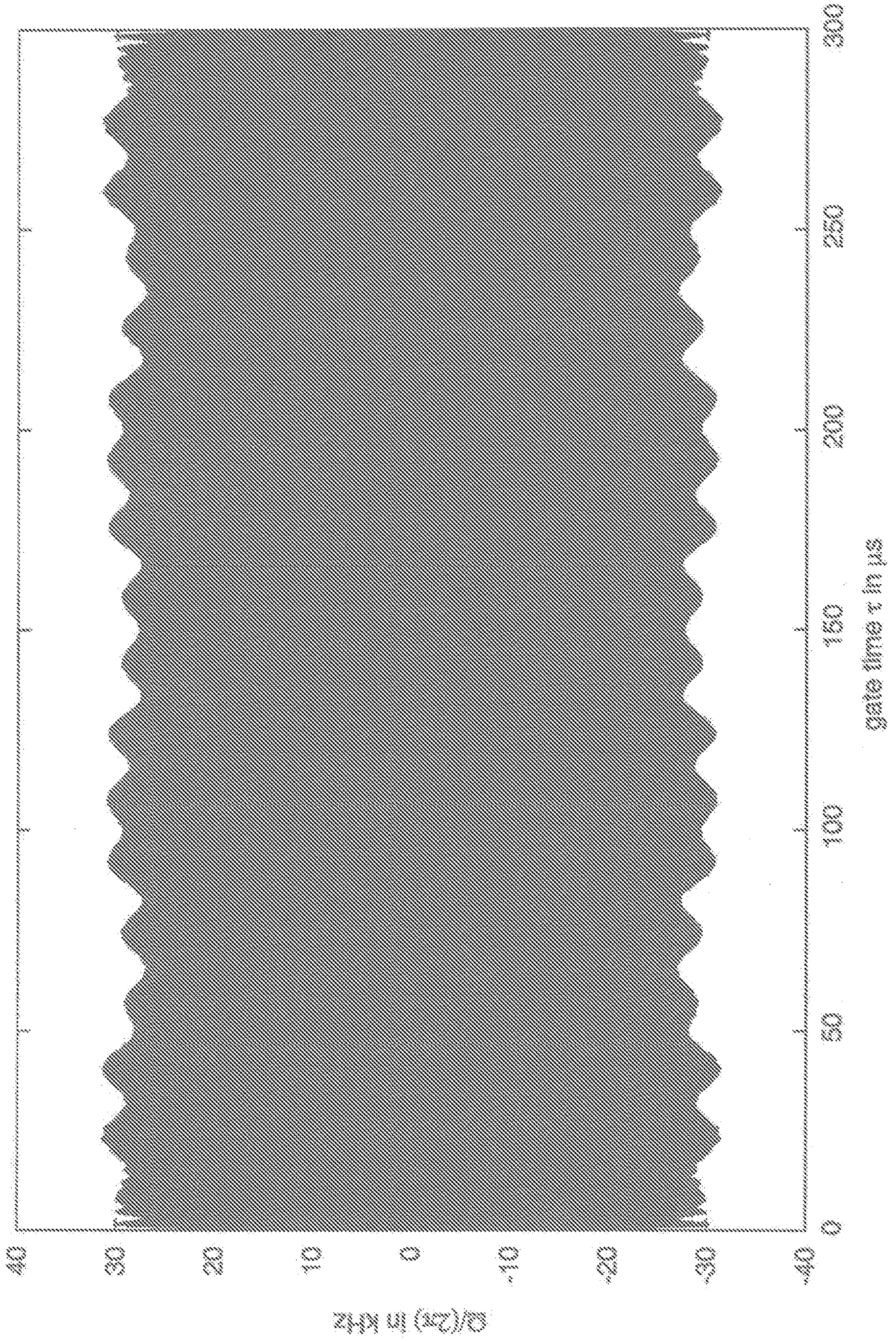
FIG. 10 depicts an example pulse function for the degree of entanglement stabilization according to aspects of this disclosure.

FIG. 10 depicts an example pulse function $g_1(t)$ computed on the basis of the trial power vector C, intended as the starting point for the computation of a pair of control pulses, targeted for the degree of entanglement stabilization order Q=3, before any iterations described in the method 800 are performed. It is observed that the maximal power requirement corresponds to a Rabi frequency of about 30 kHz. For those of ordinary skill in the art, it should be clear that this is an acceptable, modest power requirement.

Figure 11:
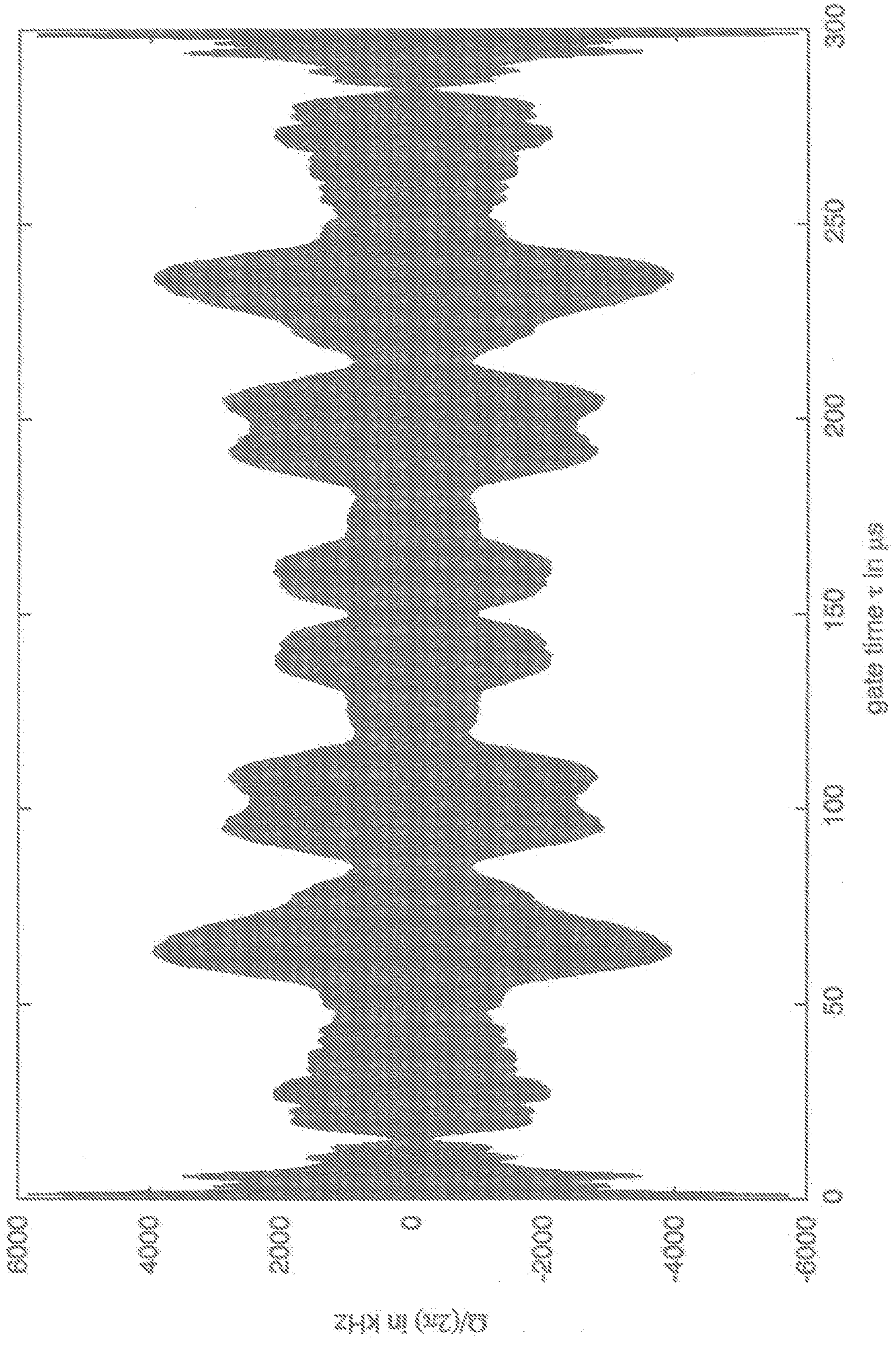
FIG. 11 depicts an example pulse function for the degree of entanglement stabilization according to aspects of this disclosure.

FIG. 11 depicts the example pulse function $g_1(t)$-associated pulse function $g_2(t)$, computed on the basis of the pulse function $g_1(t)$ which satisfies the degree of entanglement stabilization order Q=3, before any iterations described in the method 800 are performed. It is observed that the maximal power requirement corresponds to a Rabi frequency of about 6 MHz. For those of ordinary skill in the art, it should be clear that this is an unacceptably large power requirement.

Figure 12:
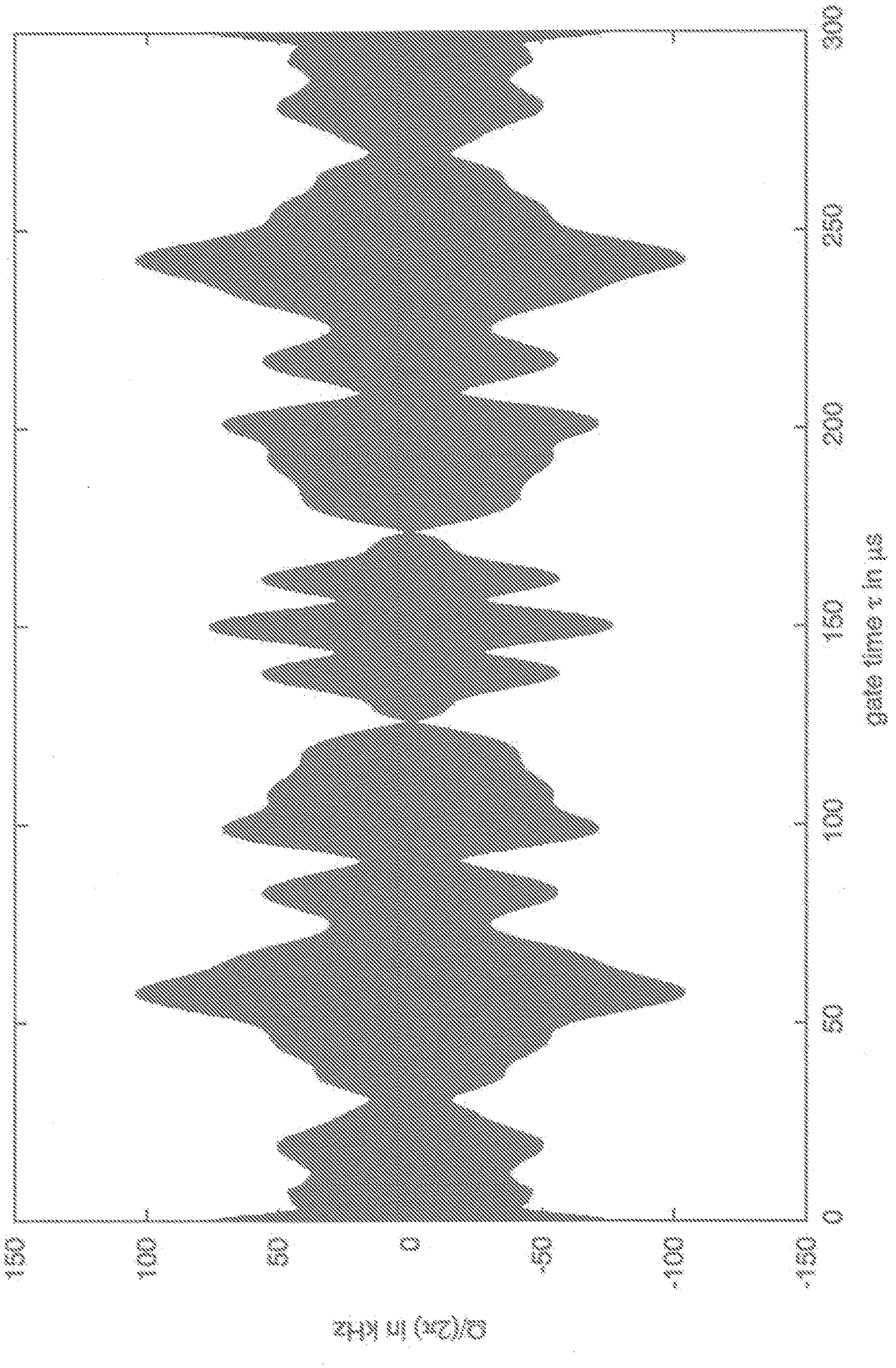
FIG. 12 depicts an example pulse function for the degree of entanglement stabilization according to aspects of this disclosure.

FIG. 12 depicts the example pulse function $g_1(t)$ for the degree of entanglement stabilization order Q=3, after ten iterations described in the method 800 are performed. It is observed that the maximal power requirement now corresponds to a Rabi frequency of about 100 kHz.

Figure 13:
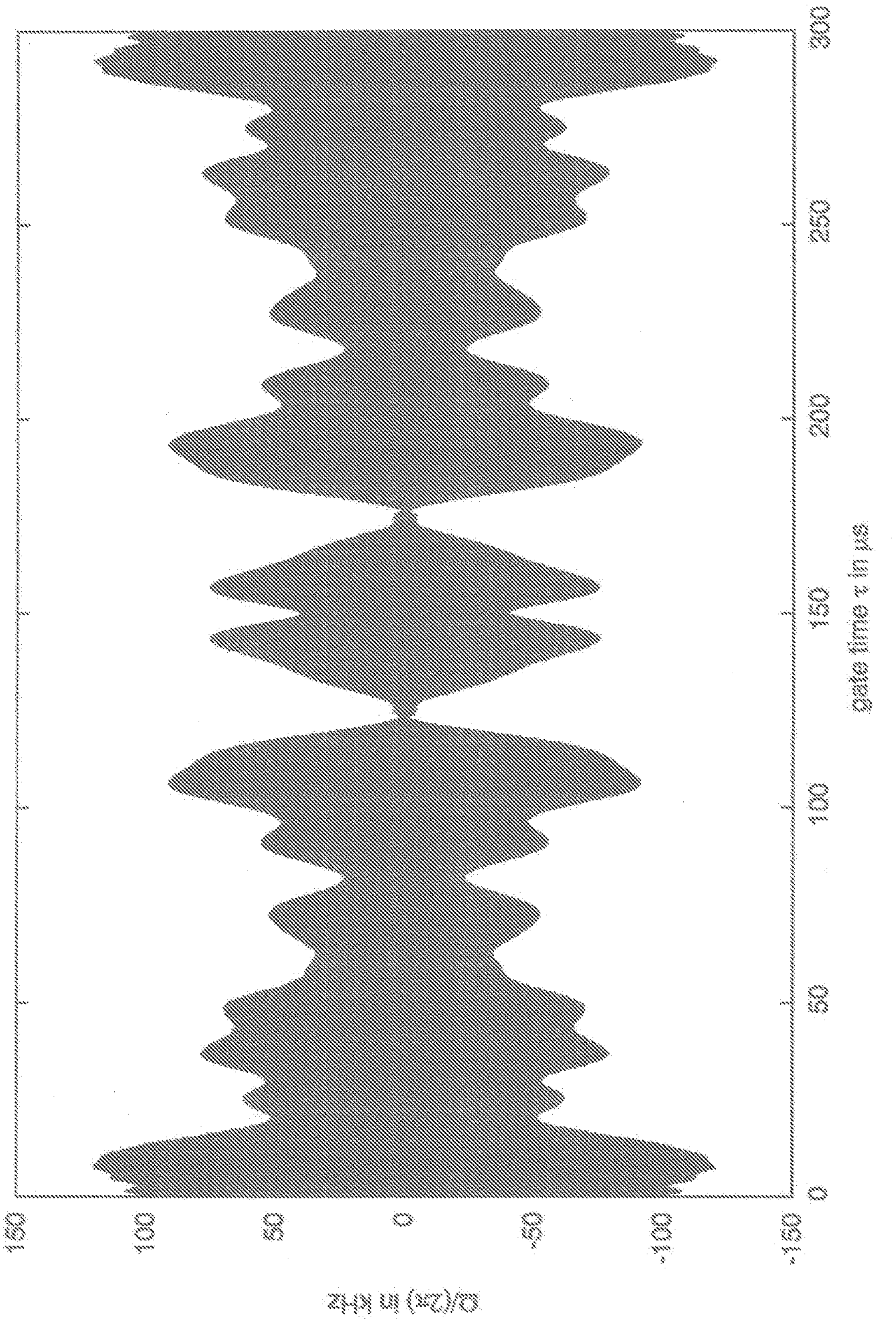
FIG. 13 depicts an example pulse function for the degree of entanglement stabilization according to aspects of this disclosure.

FIG. 13 depicts the example pulse function $g_2(t)$ for the degree of entanglement stabilization order Q=3, after ten iterations described in the method 800 are performed. It is observed that the maximal power requirement corresponds to a Rabi frequency of about 100 kHz.

For those of ordinary skill in the art, it should be clear that the power requirement of 100 kHz, depicted in FIGS. 12 and 13, is an acceptable, modest power requirement, about a factor three increase in the power requirement from the unstabilized, Q=0 trial pulse, but representing about a factor 60 reduction from the power requirement of the pulse function $g_2(t)$ before performing the ten optimization iterations according to method 800.

It should be noted that the particular embodiments or implementations described above are just some possible examples of the application of stabilized entangling operations in a quantum computing system according to the present disclosure and do not limit the possible configurations, specifications, or the like of quantum computing systems according to the present disclosure. For example, a quantum processor within a quantum computing system is not limited to a group of trapped ions with XX-gate operations described above. For example, a quantum processor may utilize architectures with a different entangling-gate operation, such as superconducting qubits. The technique provided herein can be modified to stabilize the entangling operations and optimize their power requirement in such systems with different qubit technologies.

While the foregoing is directed to specific embodiments, other and further embodiments may be devised without departing from the basic scope thereof, and the scope thereof is determined by the claims that follow.

The invention claimed is:

1. A method of performing a quantum computation process, comprising:

computing, by a classical computer, a first control pulse and a second control pulse to be applied to a pair of trapped ions in a plurality of trapped ions in a quantum processor, each of the plurality of trapped ions having two frequency-separated states defining a qubit, wherein the computing of the first and second control pulses comprises:

computing first Fourier coefficients of a first pulse function of the first control pulse and second Fourier coefficients of a second pulse function of the second control pulse based on a condition for closure of phase space trajectories and a condition for stabilization of phase-space closure;

computing a first linear combination of the computed first Fourier coefficients and a second linear combination of the computed second Fourier coefficients based on a condition for non-zero degree of entanglement, a condition for stabilization of the degree of entanglement, and a condition for minimized power; and computing the first pulse function based on the computed first linear combination of the computed first Fourier coefficients, and the second pulse function based on the computed second linear combination of the computed second Fourier coefficients; and applying, by a system controller, the first control pulse having the computed first pulse function to a first trapped ion of a pair of trapped ions, and the second control pulse having the computed second pulse function to a second trapped ion of the pair of trapped ions.

2. The method of claim 1, wherein the computing of the first linear combination of the computed first Fourier coefficients and the second linear combination of the computed second Fourier coefficients comprises executing iterations, each iteration comprising:

computing, according to a linear protocol, the second linear combination of the computed second Fourier coefficients such that the required power to implement the second control pulse is minimized, while fixing the first linear combination of the computed first Fourier coefficients at a trial linear combination of the computed first Fourier coefficients.

3. The method of claim 2, wherein each iteration further comprises:

computing the first linear combination of the computed first Fourier coefficients such that the required power to implement the first control pulse is minimized, while fixing the second linear combination of the computed second Fourier coefficients at the computed second linear combination of the computed second Fourier coefficients.

4. The method of claim 2, further comprising:

computing the trial linear combination of the computed first Fourier coefficients based on the condition for minimized power, and the condition for non-zero degree of entanglement but not the condition for stabilization of the degree of entanglement.

5. The method of claim 1, wherein the condition for stabilization of phase-space closure comprises phase space trajectories of the plurality of trapped ions being stationary up to K-th order with respect to a drift in frequencies of motional modes of the plurality of trapped ions.

6. The method of claim 1, wherein the degree of entanglement is between zero and $\pi/8$.

7. The method of claim 1, wherein the condition for stabilization of the degree of entanglement comprises the degree of entanglement between the first and second trapped ions caused by the first and second control pulses being stationary up to Q-th order with respect to a drift in frequencies of motional modes of the plurality of trapped ions.

8. A quantum computing system, comprising:

a quantum processor comprising a plurality of physical qubits, wherein each of the physical qubits comprises a trapped ion;

a classical computer configured to:

compute a first control pulse and a second control pulse to be applied to a pair of trapped ions in a plurality of trapped ions in a quantum processor, each of the plurality of trapped ions having two frequency-separated states defining a qubit, wherein the computing of the first and second control pulses comprises:

computing first Fourier coefficients of a first pulse function of the first control pulse and second Fourier coefficients of a second pulse function of the second control pulse based on a condition for closure of phase space trajectories and a condition for stabilization of phase-space closure;

computing a first linear combination of the computed first Fourier coefficients and a second linear combination of the computed second Fourier coefficients based on a condition for non-zero degree of entanglement, a condition for stabilization of the degree of entanglement, and a condition for minimized power; and computing the first pulse function based on the computed first linear combination of the computed first Fourier coefficients, and the second pulse function based on the computed second linear combination of the computed second Fourier coefficients; and a system controller configured to:

apply the first control pulse having the computed first pulse function to a first trapped ion of a pair of trapped ions, and the second control pulse having the computed second pulse function to a second trapped ion of the pair of trapped ions.

9. The quantum computing system of claim 8, wherein the computing of the first linear combination of the computed first Fourier coefficients and the second linear combination of the computed second Fourier coefficients comprises executing iterations, each iteration comprising:

computing, according to a linear protocol, the second linear combination of the computed second Fourier coefficients such that the required power to implement the second control pulse is minimized, while fixing the first linear combination of the computed first Fourier coefficients at a trial linear combination of the computed first Fourier coefficients.

10. The quantum computing system of claim 9, wherein each iteration further comprises:

computing the first linear combination of the computed first Fourier coefficients such that the required power to implement the first control pulse is minimized, while fixing the second linear combination of the computed second Fourier coefficients at the computed second linear combination of the computed second Fourier coefficients.

11. The quantum computing system of claim 9, further comprising:

computing the trial linear combination of the computed first Fourier coefficients based on the condition for minimized power, and the condition for non-zero degree of entanglement but not the condition for stabilization of the degree of entanglement.

12. The quantum computing system of claim 8, wherein the condition for stabilization of phase-space closure comprises phase space trajectories of the plurality of trapped ions being stationary up to K-th order with respect to a drift in frequencies of motional modes of the plurality of trapped ions.

13. The quantum computing system of claim 8, wherein the degree of entanglement is between zero and $\pi/8$.

14. The quantum computing system of claim 8, wherein the condition for stabilization of the degree of entanglement comprises the degree of entanglement between the first and second trapped ions caused by the first and second control pulses being stationary up to Q-th order with respect to a drift in frequencies of motional modes of the plurality of trapped ions.

15. A quantum computing system comprising non-volatile memory having a number of instructions stored therein which, when executed by one or more processors, causes the quantum computing system to perform operations comprising:

computing, by a classical computer, a first control pulse and a second control pulse to be applied to a pair of trapped ions in a plurality of trapped ions in a quantum processor, each of the plurality of trapped ions having two frequency-separated states defining a qubit, wherein the computing of the first and second control pulses comprises:

computing first Fourier coefficients of a first pulse function of the first control pulse and second Fourier coefficients of a second pulse function of the second control pulse based on a condition for closure of phase space trajectories and a condition for stabilization of phase-space closure;

computing a first linear combination of the computed first Fourier coefficients and a second linear combination of the computed second Fourier coefficients based on a condition for non-zero degree of entanglement, a condition for stabilization of the degree of entanglement, and a condition for minimized power; and computing the first pulse function based on the computed first linear combination of the computed first Fourier coefficients, and the second pulse function based on the computed second linear combination of the computed second Fourier coefficients; and applying, by a system controller, the first control pulse having the computed first pulse function to a first trapped ion of a pair of trapped ions, and the second control pulse having the computed second pulse function to a second trapped ion of the pair of trapped ions.

16. The quantum computing system of claim 15, wherein the computing of the first linear combination of the computed first Fourier coefficients and the second linear combination of the computed second Fourier coefficients comprises executing iterations, each iteration comprising:

computing, according to a linear protocol, the second linear combination of the computed second Fourier coefficients such that the required power to implement the second control pulse is minimized, while fixing the first linear combination of the computed first Fourier coefficients at a trial linear combination of the computed first Fourier coefficients.

17. The quantum computing system of claim 16, wherein each iteration further comprises:

computing the first linear combination of the computed first Fourier coefficients such that the required power to implement the first control pulse is minimized, while fixing the second linear combination of the computed second Fourier coefficients at the computed second linear combination of the computed second Fourier coefficients.

18. The quantum computing system of claim 16, further comprising:

computing the trial linear combination of the computed first Fourier coefficients based on the condition for minimized power, and the condition for non-zero degree of entanglement but not the condition for stabilization of the degree of entanglement.

19. The quantum computing system of claim 15, wherein the condition for stabilization of phase-space closure comprises phase space trajectories of the plurality of trapped ions being stationary up to K-th order with respect to a drift in frequencies of motional modes of the plurality of trapped ions, and the condition for stabilization of the degree of entanglement comprises the degree of entanglement between the first and second trapped ions caused by the first and second control pulses being stationary up to Q-th order with respect to a drift in frequencies of motional modes of the plurality of trapped ions.

20. The quantum computing system of claim 15, wherein the degree of entanglement is between zero and $\pi/8$.

* * * * *